United States Patent
Sawayama

(10) Patent No.: US 6,288,760 B1
(45) Date of Patent: Sep. 11, 2001

(54) FRONT ILLUMINATION DEVICE MOUNTED BETWEEN AN ILLUMINATED OBJECT AND A VIEWER AND A REFLECTION-TYPE LIQUID CRYSTAL DISPLAY DEVICE INCORPORATING SAME

(75) Inventor: Yutaka Sawayama, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/041,903

(22) Filed: Mar. 13, 1998

(30) Foreign Application Priority Data

Mar. 28, 1997 (JP) .................................................. 9-078233

(51) Int. Cl.$^7$ .................................................. G02F 1/1335
(52) U.S. Cl. .................................. 349/63; 362/31; 349/64
(58) Field of Search .................................. 349/56, 64, 65, 349/62, 63; 40/546; 362/26, 31

(56) References Cited

U.S. PATENT DOCUMENTS

| | | |
|---|---|---|
| 4,124,279 | 11/1978 | Byles . |
| 4,212,048 * | 7/1980 | Castleberry .............................. 362/19 |
| 4,373,282 * | 2/1983 | Wragg .................................... 40/546 |
| 4,684,939 * | 8/1987 | Streit .................................... 345/102 |
| 4,984,872 * | 1/1991 | Vick ........................................ 359/15 |
| 5,099,343 * | 3/1992 | Margerum et al. ..................... 349/63 |
| 5,329,386 * | 7/1994 | Birecki et al. ......................... 349/63 |
| 5,465,193 * | 11/1995 | Tracy ..................................... 362/31 |
| 5,477,239 * | 12/1995 | Busch et al. .......................... 349/123 |
| 5,499,165 * | 3/1996 | Holmes, Jr. ............................ 362/31 |
| 5,541,745 * | 7/1996 | Fergason .............................. 349/194 |
| 5,608,550 * | 3/1997 | Epstein et al. ......................... 349/57 |
| 5,751,388 * | 5/1998 | Larson ................................... 349/96 |
| 5,860,722 * | 1/1999 | Tai et al. ................................ 362/31 |
| 5,956,106 * | 9/1999 | Petersen et al. ....................... 349/64 |

FOREIGN PATENT DOCUMENTS

| | | |
|---|---|---|
| 57-144581 | 7/1982 | (JP) . |
| 59-099479 | 8/1984 | (JP) . |
| 158034 | 6/1993 | (JP) . |
| 06-174929 | 6/1994 | (JP) . |
| 05-035340 | 7/1995 | (JP) . |
| 07-294743 | 10/1995 | (JP) . |
| 08-095019 | 4/1996 | (JP) . |
| 08-179303 | 7/1996 | (JP) . |
| 8-201810 | 9/1996 | (JP) . |
| 08-312317 | 11/1996 | (JP) . |

OTHER PUBLICATIONS

"A Transparent Frontlighting System for Reflective–Type Displays". C.Y. Tai, et al., Society for Information Display International Symposium Digest of Technical Papers, vol. XXVI, Walt Disney World Dolphin Hotel, Orlando, FL, May 23–25, 1995; pp. 375–378.

* cited by examiner

Primary Examiner—Kenneth Parker
(74) Attorney, Agent, or Firm—David G. Conlin; William J. Daley, Jr.; Dike, Bronstein, Roberts and Cushman, Intellectual Pratice Group

(57) ABSTRACT

A front-light system for mounting on the front of a reflection-type LCD, etc., which serves as auxiliary illumination when surrounding light is insufficient, is provided with a wedge-shaped light-conducting body having a light-entry surface through which light enters from a light source, and an anisotropic light-scattering plate, which scatters light projected from an interface of the light-conducting body, so that light projected toward a liquid crystal cell is projected at an angle close to perpendicular with respect to the surface of the liquid crystal cell.

29 Claims, 21 Drawing Sheets

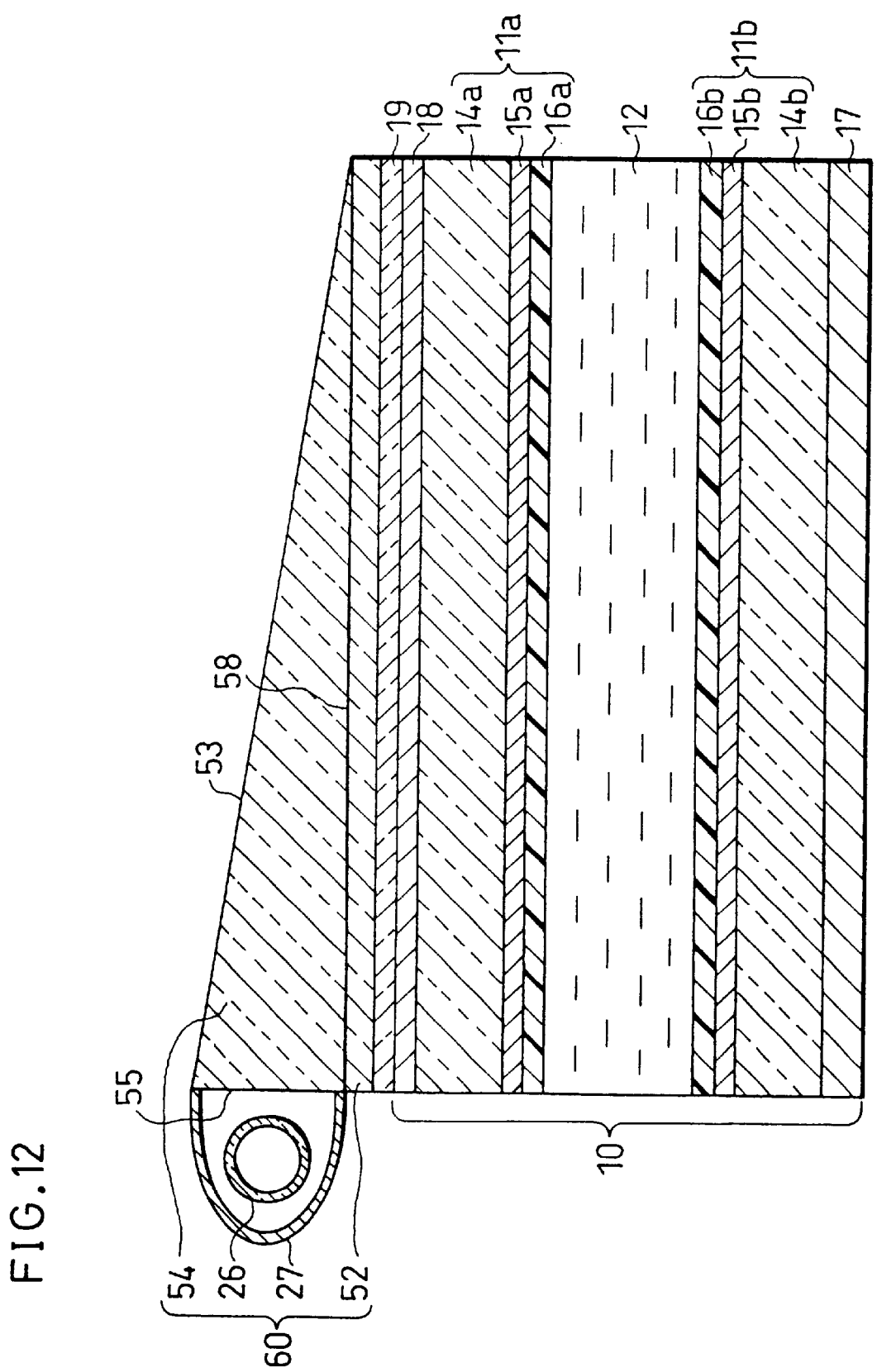

FRONT ILLUMINATION DEVICE MOUNTED BETWEEN AN ILLUMINATED OBJECT AND A VIEWER AND A REFLECTION-TYPE LIQUID CRYSTAL DISPLAY DEVICE INCORPORATING SAME

FIELD OF THE INVENTION

The present invention concerns a front illumination device to be used by mounting between an illuminated object and a viewer, and which is structured so as to project light onto the illuminated object and to transmit light reflected from the illuminated object so that the reflected light will be visible to the viewer, and concerns a reflection-type liquid crystal display device incorporating this front illumination device as an auxiliary light source.

BACKGROUND OF THE INVENTION

Unlike other displays such as the CRT (Cathode Ray Tube), PDP (Plasma Display Panel), or EL (Electro Luminescence), in the LCD (Liquid Crystal Display), the liquid crystal itself does not emit light, but displays letters or images by regulating the quantity of light transmitted from a specific light source.

Conventional liquid crystal display devices can be roughly divided into transmission-type LCDs and reflection-type LCDs. Transmission-type LCDs include a fluorescent tube or surface luminescent light source such as an EL provided on the back of the liquid crystal cell as a light source (back-light).

On the other hand, reflection-type LCDs, since they perform display using surrounding light, do not require a back-light, and thus have the advantage of low power consumption. Further, in very bright areas such as in direct sunlight, whereas the display of light-emitting displays and transmission-type LCDs becomes nearly impossible to see, that of reflection-type LCDs becomes more clearly visible. For this reason, reflection-type LCDs are applied in devices such as portable information terminals and mobile computers, for which demand has grown in recent years.

However, reflection-type LCDs have the following problems. Namely, since reflection-type LCDs use surrounding light, the brightness of display is highly dependent on the surrounding environment, and, in darkness, such as at night, there are cases when the display is not visible at all. This problem is particularly serious with reflection-type LCDs which use a color filter for color display or which use a polarizing plate, and auxiliary illumination is needed to provide against cases when surrounding light is insufficient.

However, since reflection-type LCDs are provided with a reflective plate on the back of the liquid crystal cells, they cannot use a back-light like that of transmission-type LCDs. A device called a "semi-transmission-type LCD" has been proposed, but since its display characteristics, being midway between transmission-type and reflection-type, are neither here nor there, practical application of this device is expected to be difficult.

Therefore, as auxiliary illumination for reflection-type LCDs when surrounding light is insufficient, a front-light system, for mounting on the front of the liquid crystal cell, has been proposed. Generally, such front-light systems have been made up of a light-conducting body and a light source provided at the side of the light-conducting body. Light projected by the light source from the side of the light-conducting body travels through the interior of the light-conducting body, and is reflected toward the liquid crystal cell by forms provided on the surface of the light-conducting body. As it passes through the liquid crystal cell, the projected light is modulated in accordance with the display information, and, being reflected by the reflective plate provided on the back of the liquid crystal cell, passes again through the light-conducting body toward the viewer. By this means, the viewer is enabled to see the display even when the surrounding light is insufficient.

Front-light systems of this type are disclosed, for example, in Japanese Unexamined Patent Publication No. 5-158034/1993 (Tokukaihei 5-158034) and in SID DIGEST (1995), p. 375.

The following will explain in brief the driving principle of the front-light system disclosed in SID DIGEST (1995), p. 375 with reference to FIG. 20. This front light system is provided with a light-conducting body 104, which has an interface 101 made up of flat portions 101a and inclined portions 101b, one side of the light-conducting body 104 being a light-entry surface 105, through which light from a light source 106 enters the light-conducting body 104. In other words, the light source 106 is provided in a position opposite the light-entry surface 105 of the light-conducting body 104.

Some of the light from the light source 106 entering the light-conducting body 104 from the light-entry surface 105 travels straight, and some of it is projected onto interfaces 101 and 108 between the light-conducting body 104 and the surrounding medium. At this time, if the medium surrounding the light-conducting body 104 is air, and if the refractive index of the light-conducting body 104 is around 1.5, then, according to Snell's law (Equation 1), light with an angle of incidence at the interfaces 101 and 108 of approximately 41.8° or more will be totally reflected.

$$n_1 \cdot \sin\theta_1 = n_2 \cdot \sin\theta_2$$

$$\theta_c = \arcsin(n_2/n_1) \qquad \text{(Equation 1)}$$

Here, $n_1$ is the refractive index of the first medium (here, the light-conducting body 104);

$n_2$ is the refractive index of the second medium (here, air);

$\theta_1$ is the angle of incidence from the light-conducting body 104 at the interface 101;

$\theta_2$ is the angle of light exiting from the interface 101 to the second medium; and $\theta_c$ is the critical angle.

Of the light projected onto the interfaces 101 and 108, light which is totally reflected from the inclined portions 101b (which are reflective surfaces) and light which, after being reflected from the interface 108, is reflected from the inclined portions 101b, are projected into a liquid crystal cell 110. Light projected into the liquid crystal cell 110, after being modulated by a liquid crystal layer (not shown), is reflected from a reflective plate 111 provided on the back of the liquid crystal cell 110, is projected once again into the light-conducting body 104, and passes through the flat portions 101a toward the viewer 109.

Light from the light source 106 entering through the light-entry surface 105 which is not projected onto the inclined portions 101b, but onto the flat portions 101a continues being transmitted and reflected between the interfaces 101 and 108 until it reaches an inclined portion 101b. Incidentally, the inclined portions 101b are provided so that their area, in comparison with the area of the flat portions 101a, is sufficiently small when viewed by the viewer.

The foregoing front-light system has the following problems.

(1) As shown in FIG. 21, light which does not reach an inclined portion 101b even after repeated reflections, and light which enters the light-entry surface 105 substantially perpendicularly, exit the light-conducting body 104 from a surface 107 opposite the light-entry surface 105 as light 114, and cannot be used in display. This problem is more marked the smaller the panel is, and with the sizes typically used in portable information terminals (5 in. to 6 in. diagonal), most of the light from the light source exits the light-conducting body, and thus the efficiency of light use is very poor.

(2) The form of the interface 101, which is made up of inclined portions 101b and flat portions 101a, is similar to that of a prism sheet with the peaks of the prisms flattened. Thus, as shown in FIG. 21, surrounding light 115 is easily reflected back toward the viewer 109, which leads to impairment of display quality.

Since most conventional front-light systems share these problems, improvement of the efficiency of use of the light from the light-source is needed.

SUMMARY OF THE INVENTION

The object of the present invention is to provide a front illumination device comprising a light source and a light-conducting body which guides light from the light source to an illuminated object, which is to be used by mounting in front of the illuminated object, and which is able to effectively use the light from the light source, and to provide a reflection-type liquid crystal display device which, by incorporating this front illumination device, is capable of bright display even when surrounding light is insufficient.

In order to attain the foregoing object, a first front illumination device according to the present invention comprises a light source and a light-conducting body which guides light from the light source to an illuminated object, and is to be used by mounting in front of the illuminated object; the light-conducting body including a first light-conducting body provided with a light-entry surface, through which light from the light source enters, and a second light-conducting body provided with a light exit surface, through which light exits toward the illuminated object; the first light-conducting body guiding the light from the light-entry surface to the second light-conducting body; and the second light-conducting body provided so that the light exiting therefrom exits in a direction closer to the normal direction of the light exit surface than the direction in which light exits from the first light-conducting body.

In the above-mentioned first front illumination device, light from the light source enters from the light-entry surface of the first light-conducting body and is projected from the light exit surface of the second light-conducting body toward the illuminated object, and the device is used by mounting in front of the illuminated object. In other words, light projected toward the illuminated object is reflected therefrom, passes again through the front illumination device, and reaches the viewer, located on the side of the front illumination device opposite the illuminated object, thus enabling the viewer to view the image of the illuminated object.

In the foregoing structure, as light guided from the first light-conducting body passes through the second light-conducting body, the portion of the light which is of the normal direction of the light exit surface is increased, and thus the direction of the light exiting from the light exit surface is brought closer to the normal direction of the light exit surface. This increases the percentage of reflected light from the light projected onto the illuminated object which returns to the light exit surface, and thus the quantity of light reaching the viewer located on the opposite side of the front illumination device from the illuminated object is also increased. As a result, the efficiency of use of the light from the light source is increased, and a bright front illumination device can be provided. In addition, since the second light-conducting body brings the exit direction of light projected by the front illumination device closer to the normal direction of the light exit surface, this device also has the advantage that the viewing angle range when the viewer views the display in reflective mode (when the front illumination device is not illuminated) is substantially the same as that when the front illumination device is illuminated.

In the above-mentioned first front illumination device, a light-scattering body which scatters light may be used as the second light-conducting body. In this case, the exit direction of light projected from the front illumination device can be brought closer to the normal direction of the light exit surface, and the illuminated object can be illuminated evenly by scattered light. As a result, the light from the light source can be used efficiently for illumination, and a front illumination device can be provided which is brighter, and which realizes a clear illuminated object image which is free of unevenness.

It is preferable if the light-scattering body is a forward-scattering body. In this case, since the light-scattering body (second light-conducting body) is a forward-scattering body, which scatters the light projected from the first light-conducting body in the direction it is traveling only, there is no backward scattering of the light from the first light-conducting body. As a result, the efficiency of light use can be further improved, and impairment of the image of the illuminated object due to backward scattering can be prevented.

Alternatively, it is preferable if the light-scattering body is an anisotropic scattering body, which only scatters light projected at an angle within a predetermined range, and if at least part of the light projected from the first light-conducting body into the second light-conducting body is projected at angles included within this predetermined range.

With the foregoing structure, the anisotropic scattering body does not act on light, such as that traveling toward the viewer, which is projected at an angle outside the predetermined range, and accordingly deterioration of display quality due to unnecessary scattering can be prevented. Further, if the light projected from the first light-conducting body enters at an angle within the predetermined range within which the light-scattering body (second light-conducting body) scatters light, the light projected from the first light-conducting body can be scattered efficiently, and the efficiency of light use can be further improved.

In the above-mentioned first front illumination device, the second light-conducting body may also be a diffracting element, which diffracts light.

Further, it is preferable if this diffracting element only diffracts light projected at an angle within a predetermined range, and if at least part of the light projected from the first light-conducting body into the diffracting element is projected at angles within this predetermined range.

With the foregoing structure, the diffracting element does not act on light, such as that traveling toward the viewer, which is projected at an angle outside the predetermined range, and accordingly deterioration of display quality due to unnecessary diffraction can be prevented. Further, if the light projected from the first light-conducting body enters at an angle within the predetermined range within which the diffracting element (second light-conducting body) diffracts light, the light projected from the first light-conducting body can be diffracted efficiently, and the efficiency of light use can be further improved.

The diffracting element may also be a hologram. With a hologram, the outgoing light can be precisely regulated to within a specific range more easily than with an anisotropic scattering plate, etc. By using a hologram as the second light-conducting body in this way, the direction of light projected from the first light-conducting body can be precisely regulated to within a predetermined range, and a front illumination device with superior directivity can be provided.

In the above-mentioned first front illumination device, a light control means for limiting the spread of light from the light source may also be provided between the light source and the light-entry surface.

Light from the light source is guided by the first light-conducting body so as to be projected into the second light-conducting body. In order to decrease the leakage of light from the first light-conducting body at the interface with the surrounding medium, it is preferable to reduce the portion of light striking the interface at an angle smaller than the critical angle by giving the light from the light source a certain amount of directivity. For this reason, since the foregoing structure provides a light control means for limiting the spread of light from the light source, the amount of light leaking out of the light-conducting body is reduced, thus further improving the efficiency of light use, and preventing bleeding and blurring of the image of the illuminated object. As a result, a front illumination device can be provided which realizes a bright, clear illuminated object image.

The above-mentioned first front illumination device may also be structured so that a gap between the first and second light-conducting bodies is filled with a filling agent for ameliorating differences in refractive indices at the optical interfaces between the two light-conducting bodies.

In comparison with a structure in which the gap between the two light-conducting bodies is filled with air, the foregoing structure is able to reduce attenuation of the light due to reflection at the optical interfaces between the first and second light-conducting bodies. As a result, the efficiency of use of light from the light source can be further improved, and a brighter front illumination device can be realized. If the refractive index of the filling agent is equal to that of at least one of the light-conducting bodies, this structure can be made even more effective, since the number of optical interfaces between the first and second light-conducting bodies is reduced.

The above-mentioned first front illumination device may also be structured so as to provide a light-condensing means for concentrating light from the light source onto only the light-entry surface of the first light-conducting body.

With this structure, since loss of the light from the light source is further reduced, the efficiency of use of light from the light source can be further improved, and a brighter front illumination device can be realized. In addition, since the amount of light entering the second light-conducting body, etc. from unwanted directions can be reduced, the occurrence of stray light can be prevented, and a front illumination device can be provided which is capable of a clear illuminated object image.

In order to attain the object mentioned above, a reflection-type liquid crystal display device according to the present invention includes a reflection-type liquid crystal element having a reflective plate, and is provided with the above-mentioned first front illumination device mounted on the front of the reflection-type liquid crystal element.

With the foregoing structure, the device can be used with the front illumination device off when there is sufficient surrounding light, such as outdoors during the day, and with the front illumination device illuminated when surrounding light is insufficient. As a result, a reflection-type liquid crystal display device can be provided which is able to realize high-quality display which is always bright, regardless of the surrounding environment.

The foregoing reflection-type liquid crystal display device may also be structured so that a gap between the reflection-type liquid crystal element and the front illumination device is filled with a filling agent for ameliorating differences in refractive indices at optical interfaces between the reflection-type liquid crystal element and the front illumination device.

In comparison with a structure in which the gap between the reflection-type liquid crystal element and the front illumination device is filled with air, the foregoing structure is able to reduce attenuation of the light due to reflection at the optical interfaces between the reflection-type liquid crystal element and the front illumination device. As a result, the efficiency of use of light from the light source can be further improved, and a brighter front illumination device can be realized.

In order to attain the object mentioned above, a second front illumination device according to the present invention comprises a light source and a light-conducting body, and is to be used by mounting in front of an illuminated object; the light-conducting body being a polyhedron provided with a light-entry surface, through which light from the light source enters, a first light exit surface, through which light exits toward the illuminated object, and a second light exit surface opposite the first light exit surface; the first and second light exit surfaces being provided so that the distance therebetween grows smaller the greater the distance from the light-entry surface.

In the foregoing structure, the first and second light exit surfaces are provided so that the distance therebetween grows smaller the greater the distance from the light-entry surface, i.e., so that the second light exit surface inclines with respect to the first light exit surface. Thus, at least part of that portion of the light from the light-entry surface which travels parallel to the first light exit surface is reflected from the second light exit surface toward the first light exit surface, from which it is projected toward the illuminated object. In other words, that portion of the light traveling parallel to the first light exit surface can also be used as illuminating light, and thus the efficiency of use of light from the light source is improved over a structure in which first and second light exit surfaces are provided so as to be parallel. As a result, a bright front illumination device can be provided.

The above-mentioned second front illumination device may also be structured so as to satisfy the following inequality, in which $\alpha$ is the angle of inclination of the second light exit surface with respect to the first light exit surface, and $\theta_c$ is the critical angle of the second light exit surface:

$$\alpha \leq 90° - \theta_c$$

With this structure, that portion of the light from the light-entry surface traveling parallel to the first light exit surface is totally reflected at the second light exit surface. By this means, leakage of light from the second light exit surface toward the viewer can be eliminated. As a result, a front illumination device can be provided which realizes a bright, clear illuminated object image.

The above-mentioned second front illumination device may also be structured so that the second light exit surface is provided with an angle of inclination with respect to the first light exit surface of 40° or less.

The above-mentioned second front-illumination device may also be structured so as to provide between the light source and the light-entry surface a light control means for limiting the spread of light from the light source.

Most of the light from the light-entry surface is reflected by the second light exit surface, but in order to decrease the leakage of light from the light-conducting body through the second light exit surface, it is preferable to reduce the portion of light striking the second light exit surface at an angle smaller than the critical angle by giving the light from the light source a certain amount of directivity. For this reason, by providing the foregoing structure with a light control means for limiting the spread of light from the light source, the amount of light leaking through the second light exit surface can be reduced, thus further improving the efficiency of light use, and preventing bleeding and blurring of the image of the illuminated object.

The above-mentioned second front illumination device may also be structured so as to provide a light-condensing means for concentrating light from the light source onto only the light-entry surface of the light-conducting body.

With this structure, since loss of the light from the light source is further reduced, the efficiency of use of light from the light source can be further improved, and a brighter front illumination device can be realized.

The above-mentioned second front illumination device may also be structured so that the light-conducting body is a first light-conducting body, and a second light-conducting body is further provided outside the first light exit surface of the first light-conducting body; in which the second light-conducting body transmits light projected from the first light exit surface in such a way that light exits from the second light-conducting body in a direction closer to the normal direction of the first light exit surface than the direction in which light is projected from the first light exit surface.

Since the second light-conducting body, in transmitting light projected from the first light exit surface, increases the portion thereof which is of the normal direction of the first light exit surface, the foregoing structure can bring the light projected toward the illuminated object closer to the normal direction of the first light exit surface. By this means, since it is easier for the reflected light from the light projected onto the illuminated object to return to the light exit surface, the quantity of light reaching the viewer located on the opposite side of the front illumination device from the illuminated object is increased. As a result, the efficiency of use of the light from the light source is increased, and a bright front illumination device can be provided. In addition, since the second light-conducting body brings the exit direction of light projected by the front illumination device closer to the normal direction of the first light exit surface, this device also has the advantage that the viewing angle range when the viewer views the display in reflective mode (when the front illumination device is not illuminated) is substantially the same as that when the front illumination device is illuminated.

In order to attain the object mentioned above, another reflection-type liquid crystal display device according to the present invention includes a reflection-type liquid crystal element having a reflective plate, and is provided with the above-mentioned second front illumination device mounted on the front of the reflection-type liquid crystal element.

With the foregoing structure, the device can be used with the front illumination device off when there is sufficient surrounding light, such as outdoors during the day, and with the front illumination device illuminated when surrounding light is insufficient. As a result, a reflection-type liquid crystal display device can be provided which is able to realize high-quality display which is always bright, regardless of the surrounding environment.

The foregoing reflection-type liquid crystal display device may also be structured so that a gap between the reflection-type liquid crystal element and the second front illumination device is filled with a filling agent for ameliorating differences in refractive indices at optical interfaces between the reflection-type liquid crystal element and the second front illumination device.

In comparison with a structure in which the gap between the reflection-type liquid crystal element and the front illumination device is filled with air, the foregoing structure is able to reduce attenuation of the light due to reflection at the optical interfaces between the reflection-type liquid crystal element and the front illumination device. As a result, the efficiency of use of light from the light source can be further improved, and a brighter front illumination device can be realized.

In the foregoing reflection-type liquid crystal display device, it is preferable if the angle of inclination of the second light exit surface with respect to the first light exit surface is 10° or less.

With a greater angle of inclination, the useable range of angles of incidence of surrounding light is greatly reduced, and a greater portion of reflected light from the liquid crystal element is reflected nearly parallel to the surface of the liquid crystal element. For this reason, with an angle of inclination of 10° or less, a bright display can be obtained through effective use of surrounding light.

Additional objects, features, and strengths of the present invention will be made clear by the description below. Further, the advantages of the present invention will be evident from the following explanation in reference to the drawings.

Figure 1:
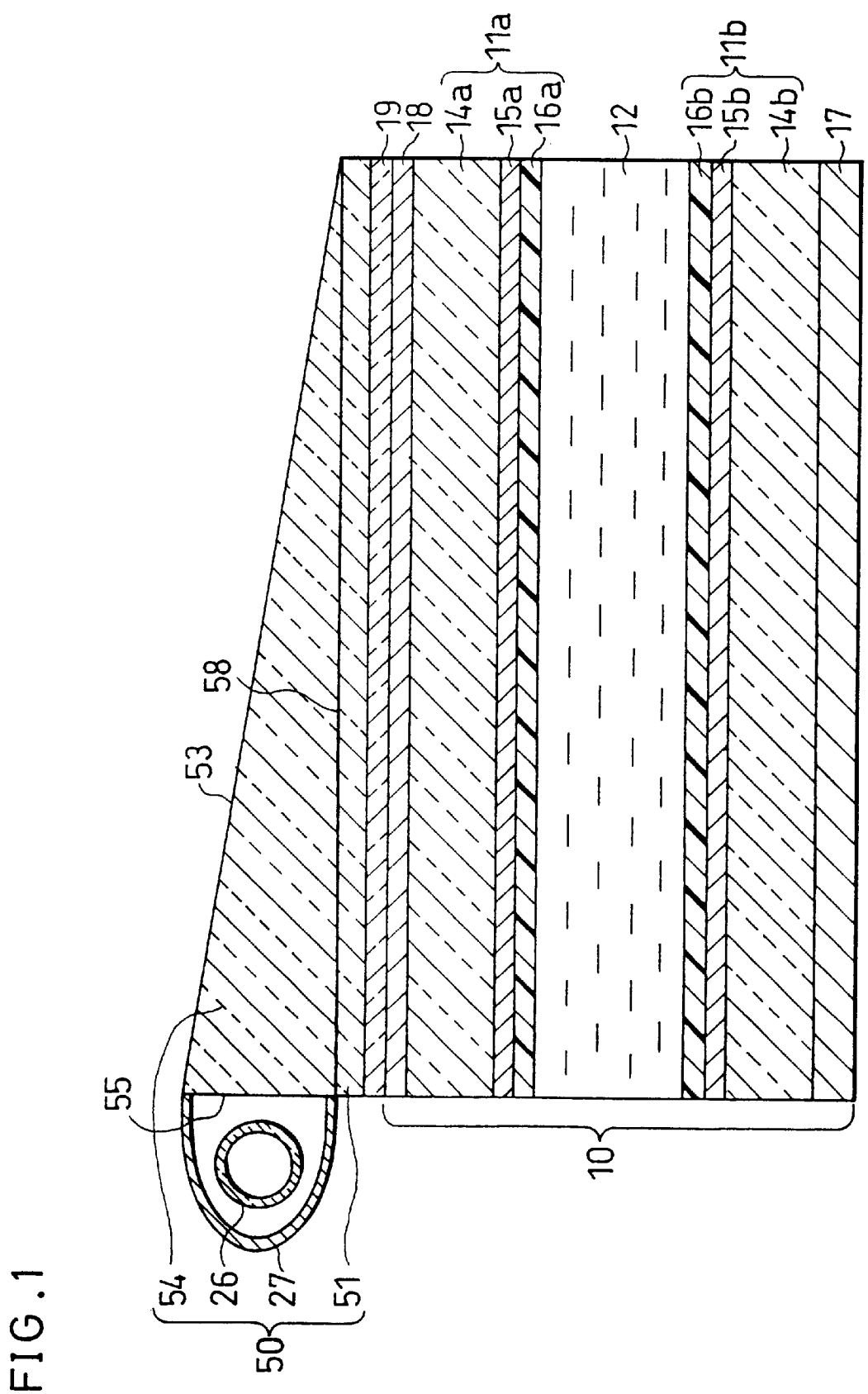
FIG. 1 is a cross-sectional diagram showing the structure of a reflection-type LCD according to one embodiment of the present invention.

and exit angle $\theta_{11}$ (angle with respect to normal direction of reflective plate) of surrounding light in response to angle of inclination $\alpha$, when the reflection-type LCD shown in FIG. 1 is used in reflective mode.

Figure 7:
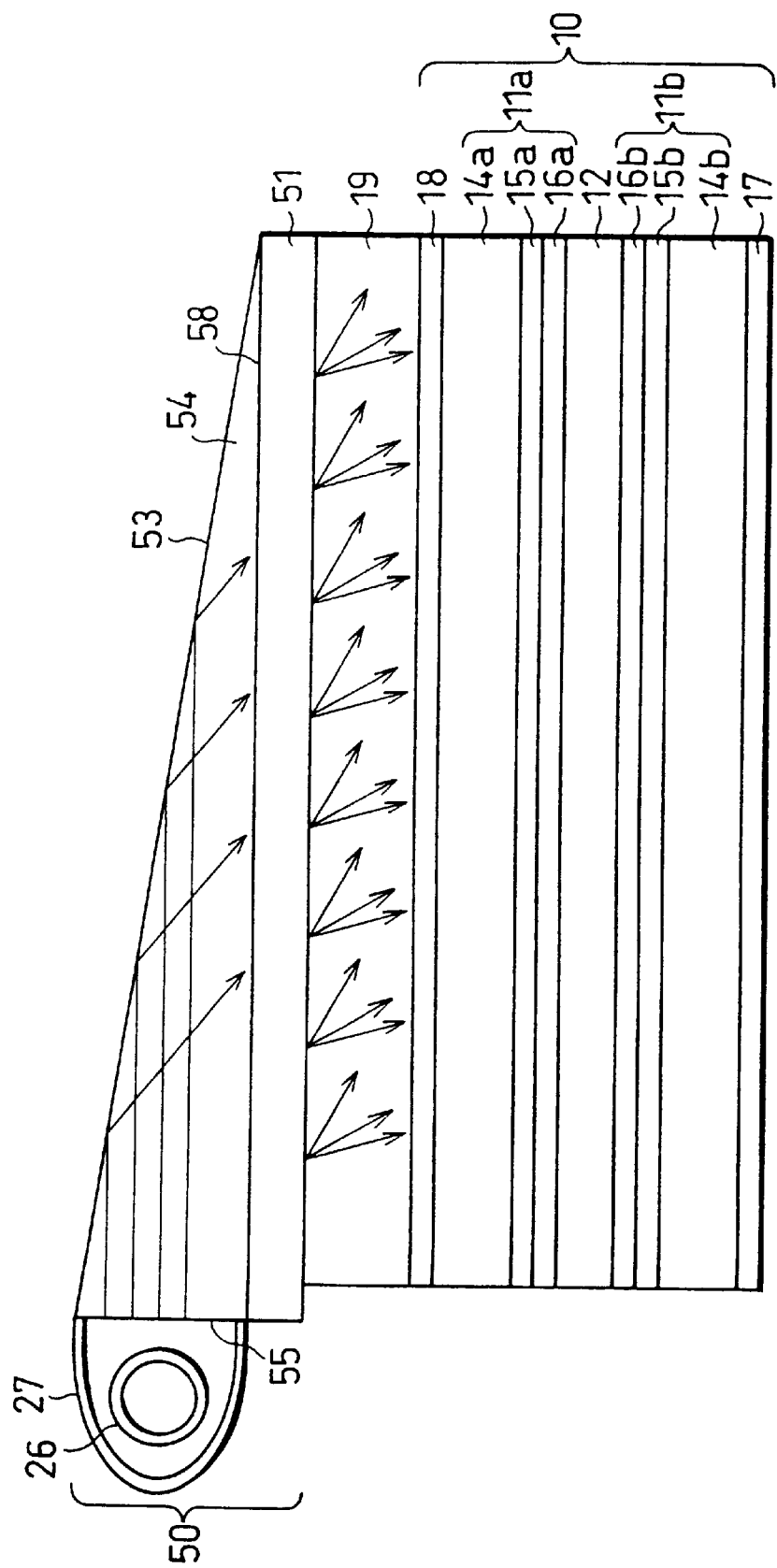

FIG. 7 is an explanatory diagram showing the behavior of light in the reflection-type LCD shown in FIG. 1.

Figure 8:
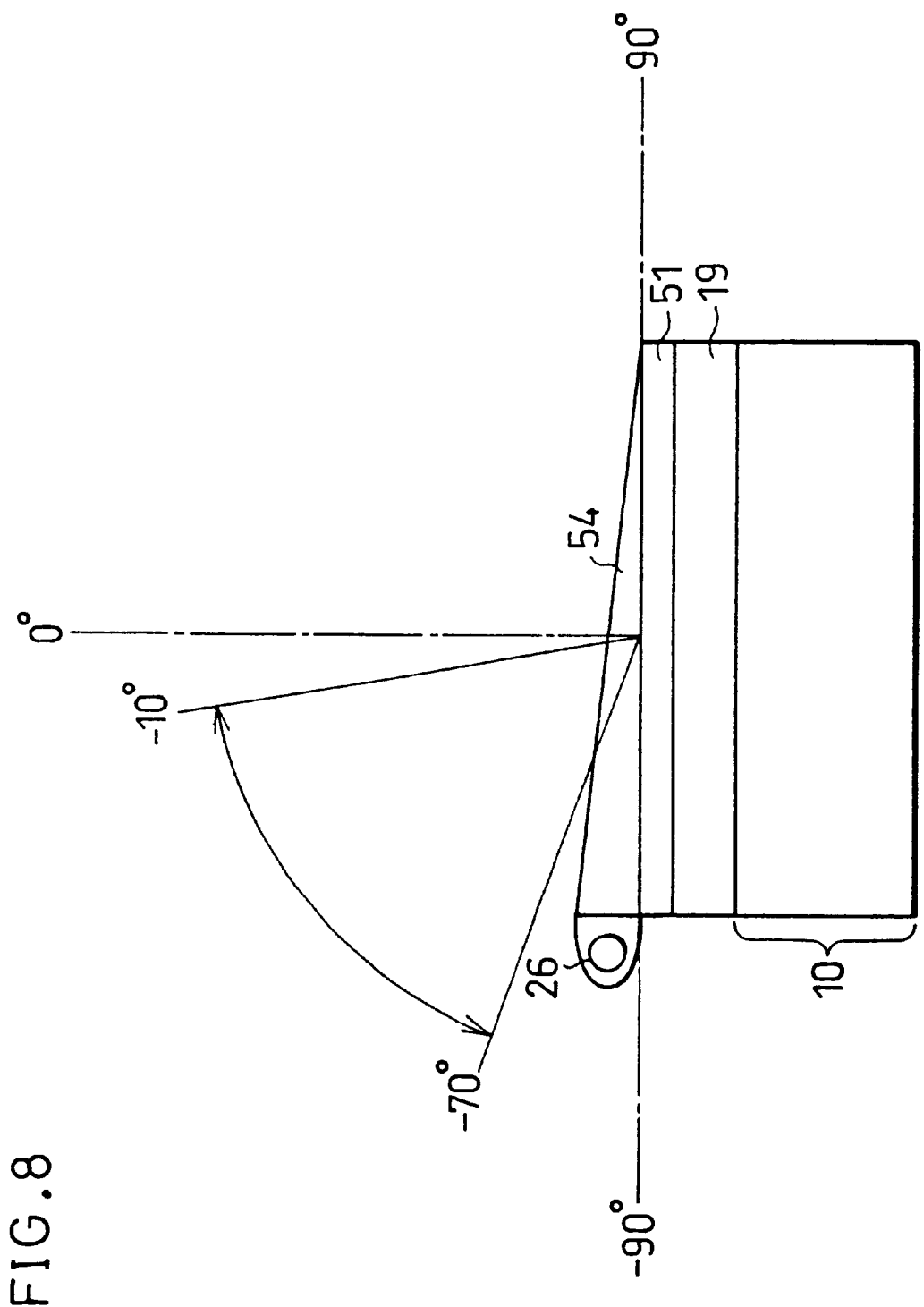

FIG. 8 is an explanatory diagram showing the range of projection of light from a first light-conducting body to a second light-conducting body in the reflection-type LCD shown in FIG. 1.

Figure 9:
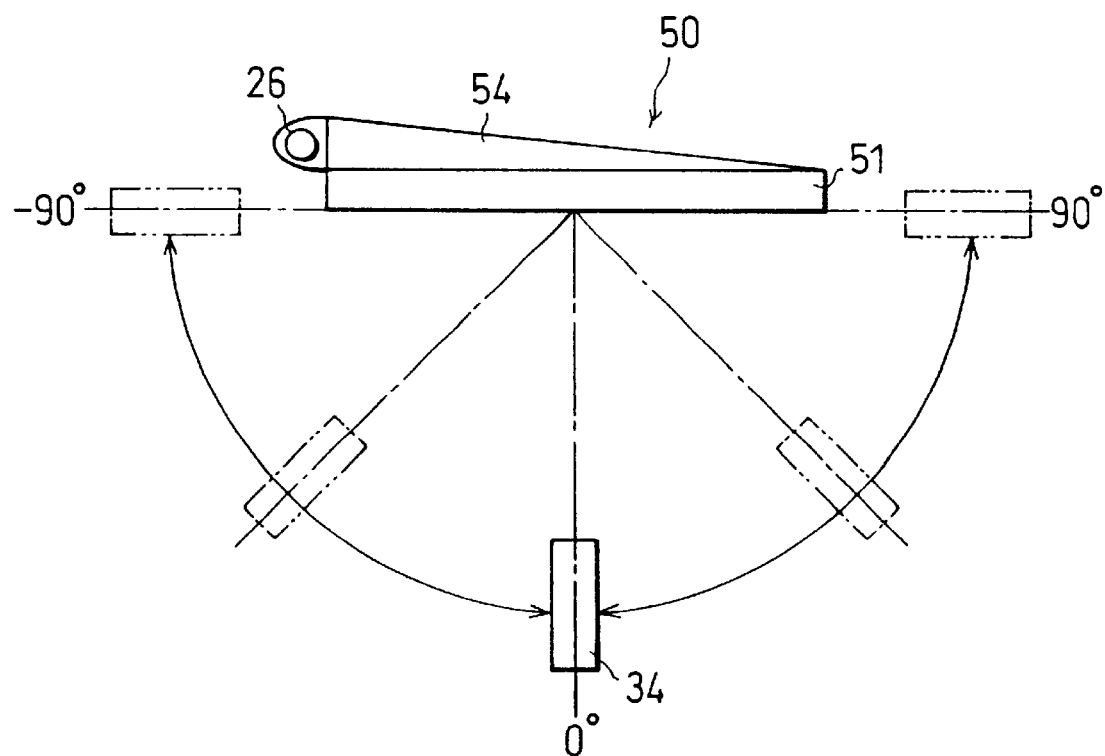

FIG. 9 is an explanatory diagram showing a measurement system for measuring the light intensity of illumination in the front-light system included in the reflection-type LCD shown in FIG. 1.

Figure 10:
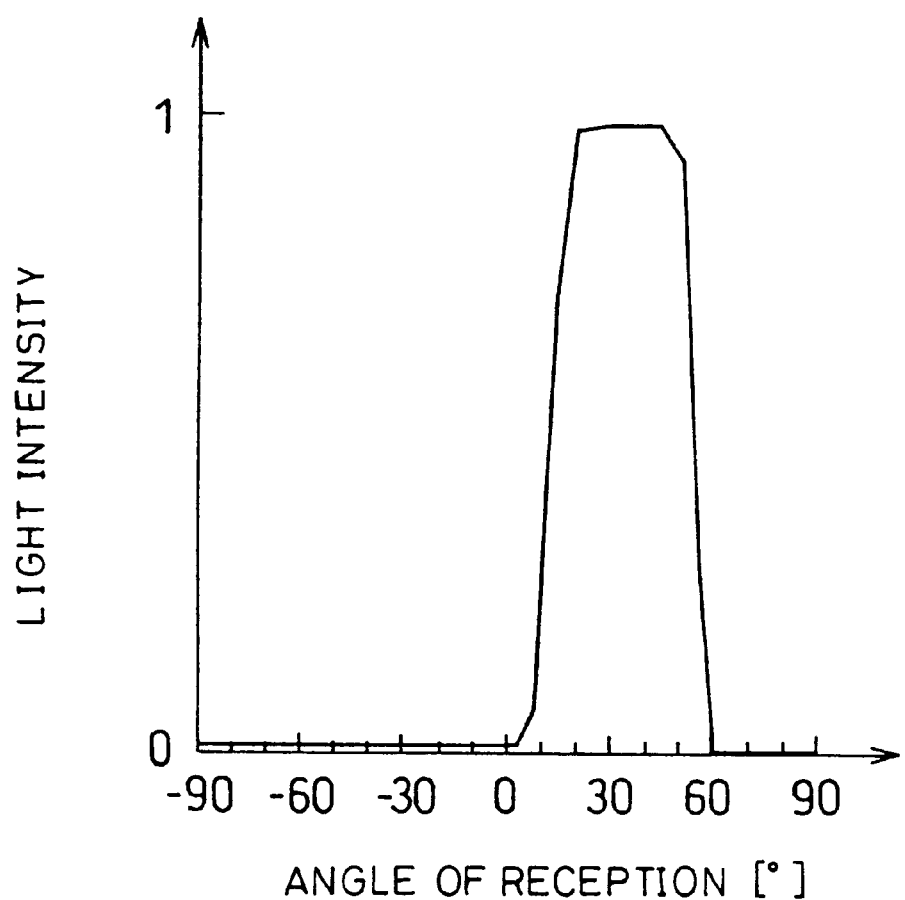

FIG. 10 is a graph showing the intensity of illumination in the front-light system included in the reflection-type LCD shown in FIG. 1.

Figure 11A:
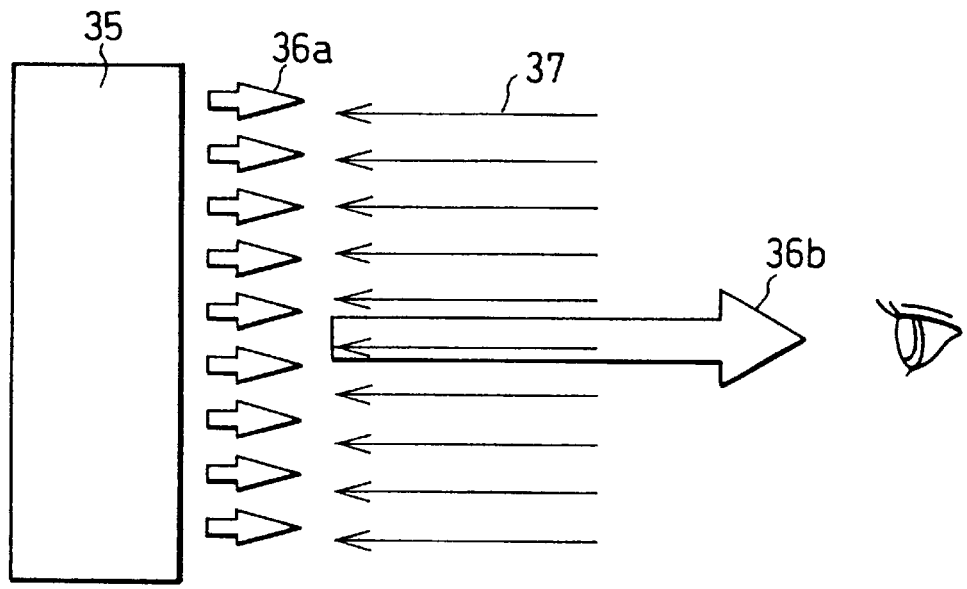
Figure 11B:
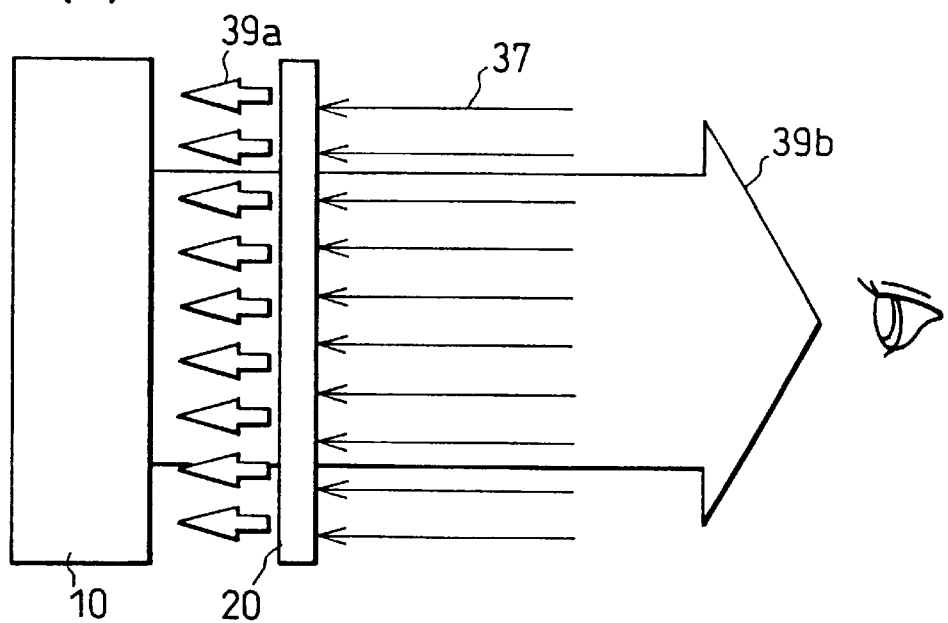

FIG. 11(a) is a schematic diagram showing the relationship between light projected from a light-emitting display and surrounding light, and FIG. 11(b) is a schematic diagram showing the relationship between light projected from the reflection-type LCD shown in FIG. 1 and surrounding light.

FIG. 12 is a cross-sectional diagram showing the structure of a reflection-type LCD according to another embodiment of the present invention.

Figure 13:
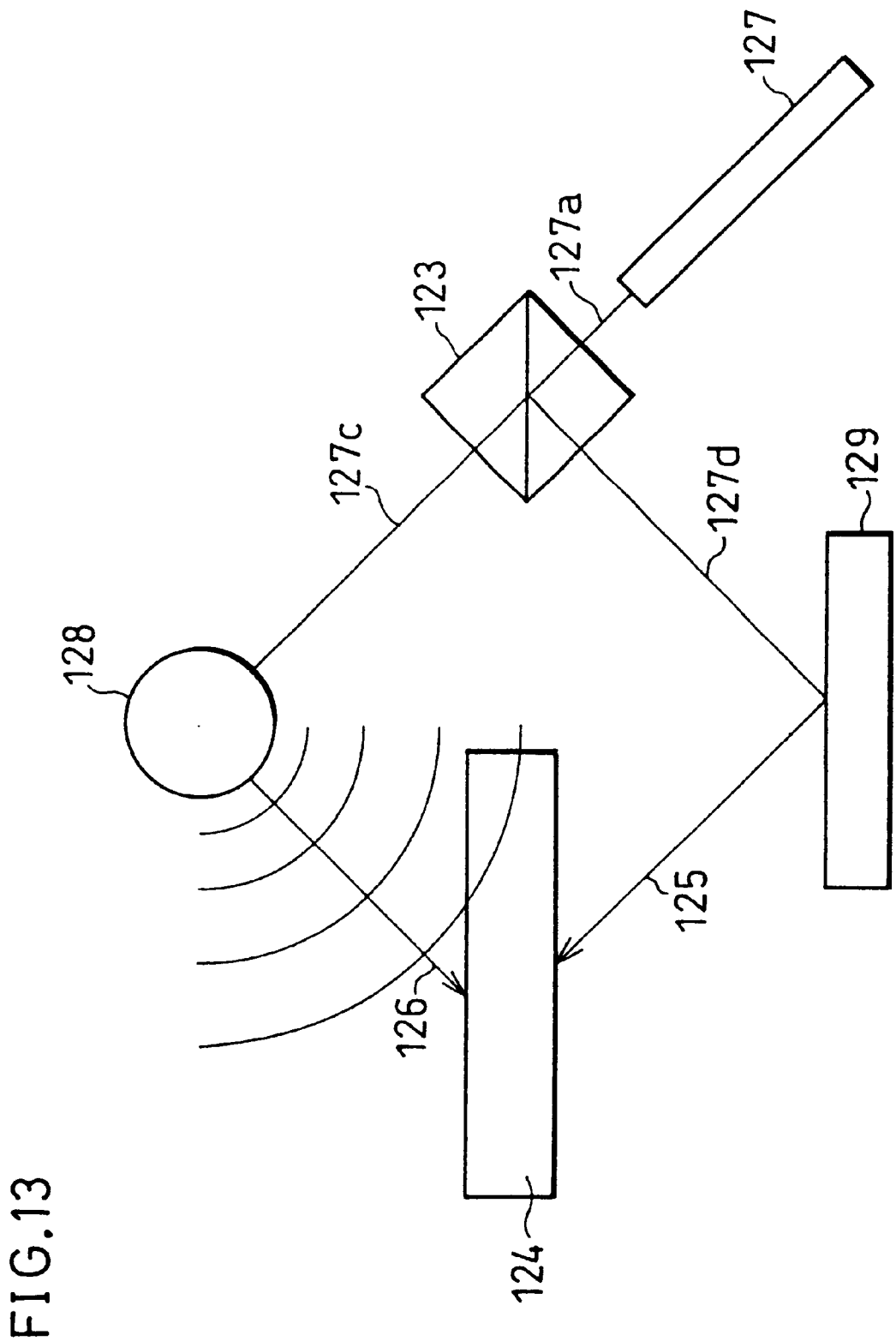

FIG. 13 is an explanatory diagram showing a typical method of preparing a hologram.

FIGS. 14(a) through 14(d) are explanatory diagrams showing the main parts of a process of manufacturing the front-light system included in the reflection-type LCD shown in FIG. 12.

Figure 15:
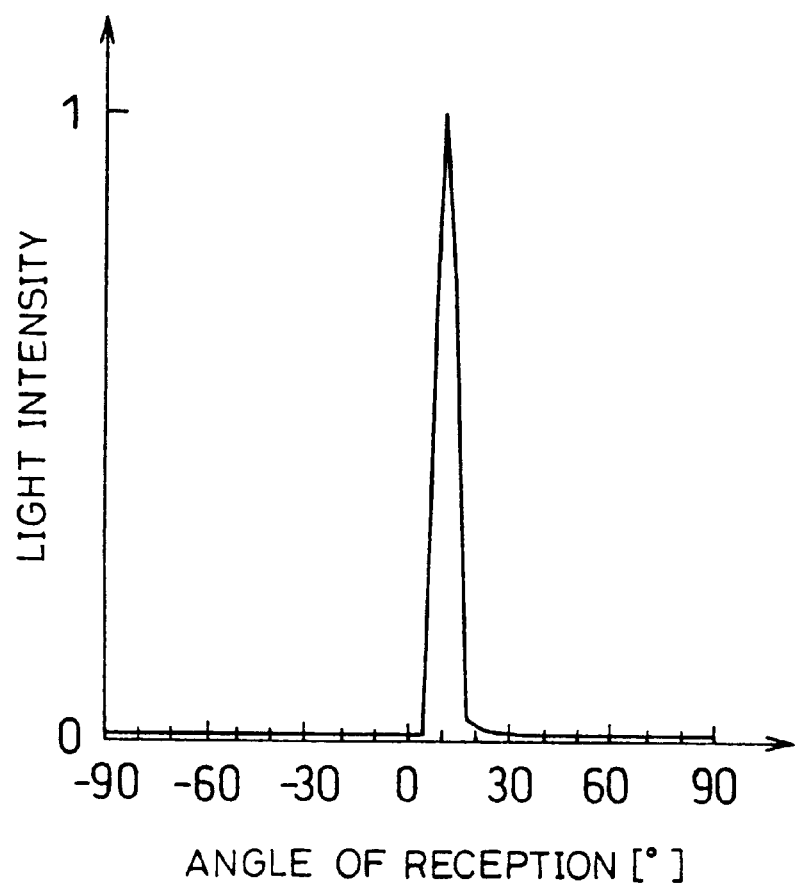

FIG. 15 is a graph showing the intensity of illumination in the front-light system included in the reflection-type LCD shown in FIG. 12.

Figure 16:
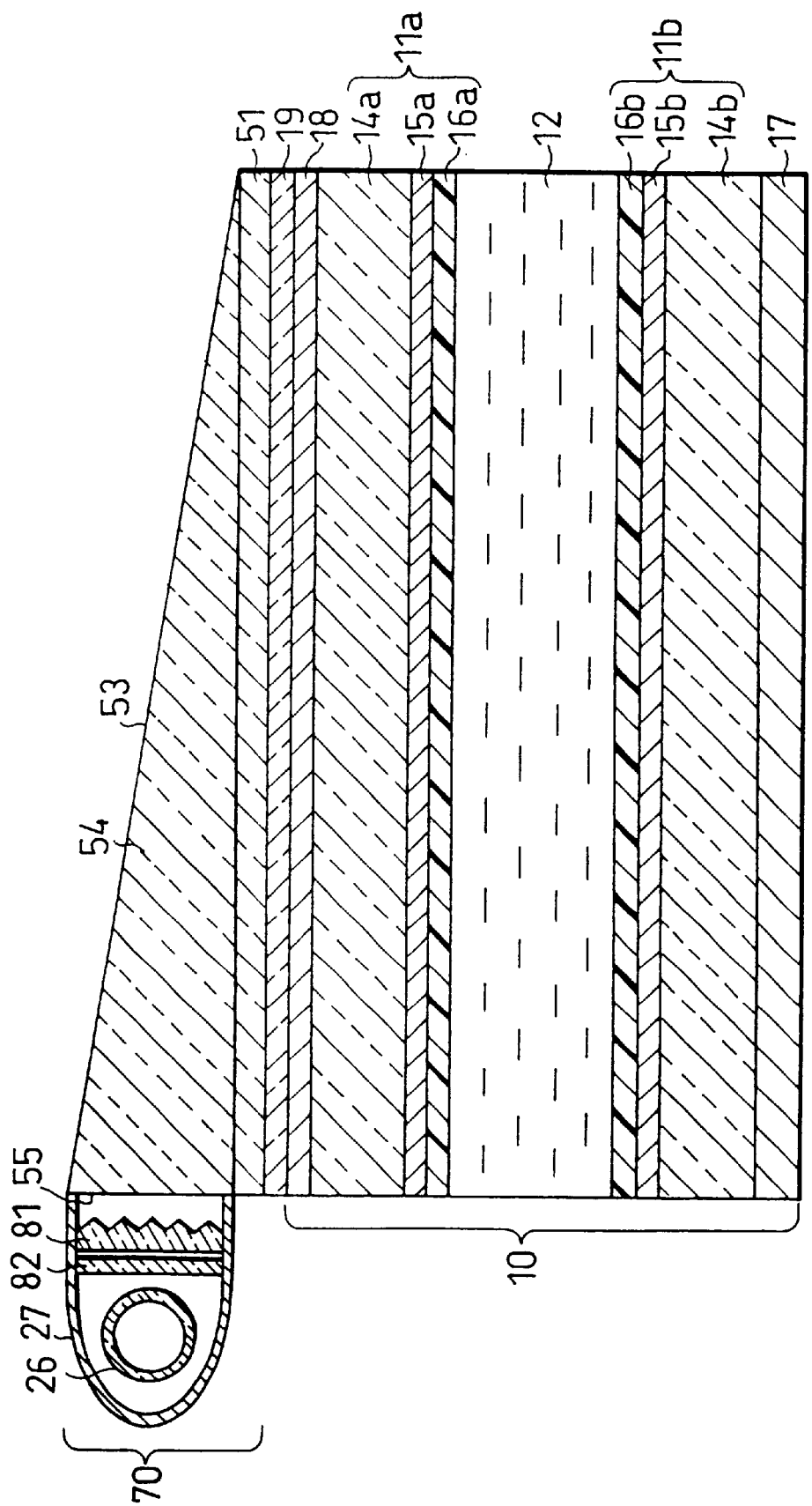

FIG. 16 is a cross-sectional diagram showing the structure of a reflection-type LCD according to a further embodiment of the present invention.

Figure 17:
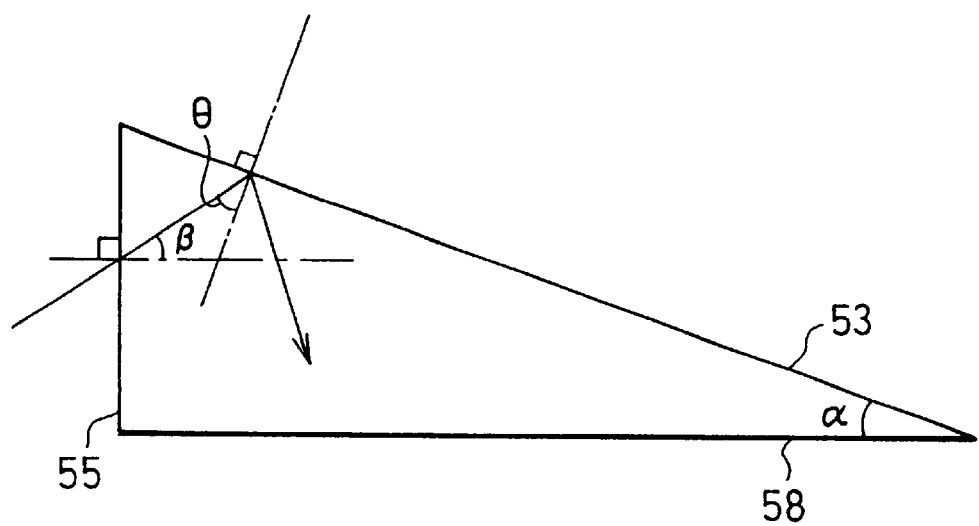

FIG. 17 is an explanatory diagram showing the behavior of light after it is projected into a light-conducting body of the reflection-type LCD shown in FIG. 16.

Figure 18:
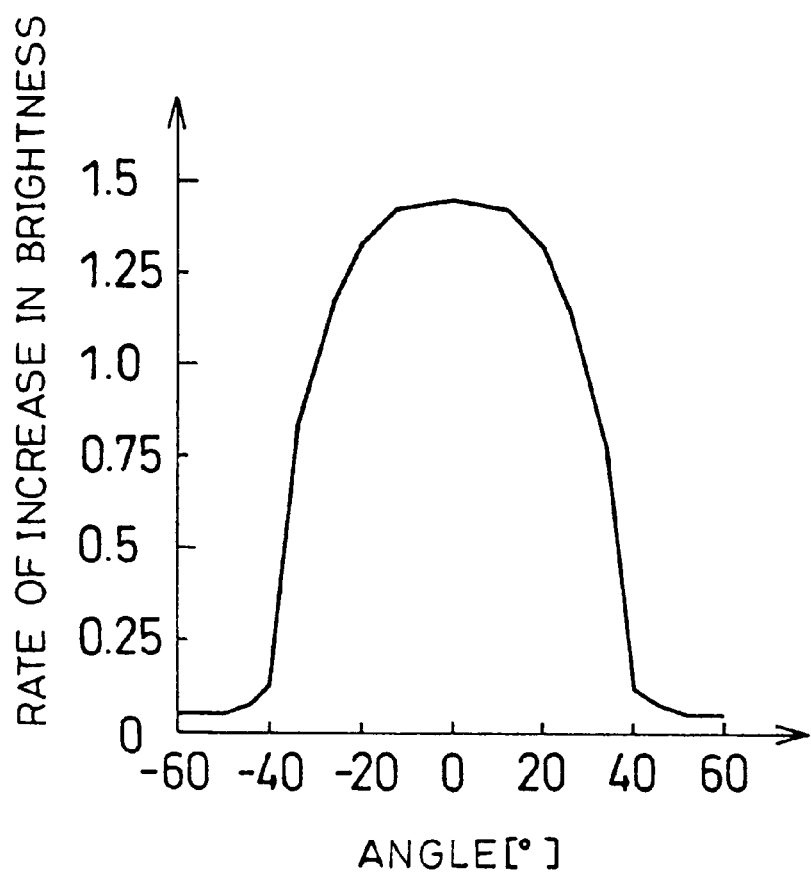

FIG. 18 is a graph showing condensing characteristics of a prism sheet included in the reflection-type LCD shown in FIG. 16.

Figure 19A:
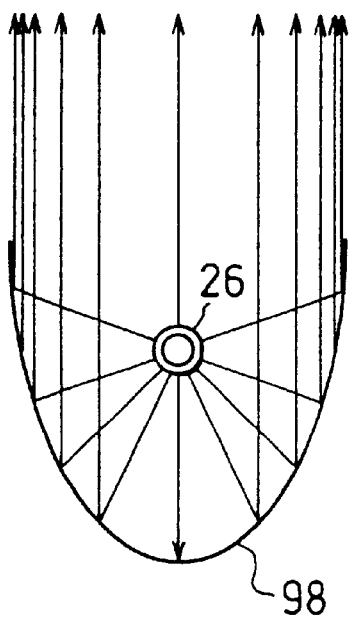
Figure 19B:
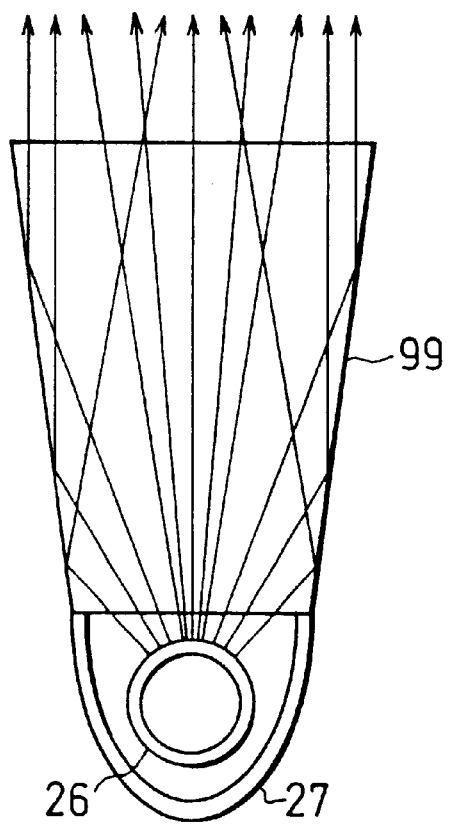

FIGS. 19(a) and 19(b) are explanatory diagrams showing alternative structures which may be used, instead of the diffusion plate and prism sheet shown in FIG. 16, to limit the spread of entering light.

Figure 20:
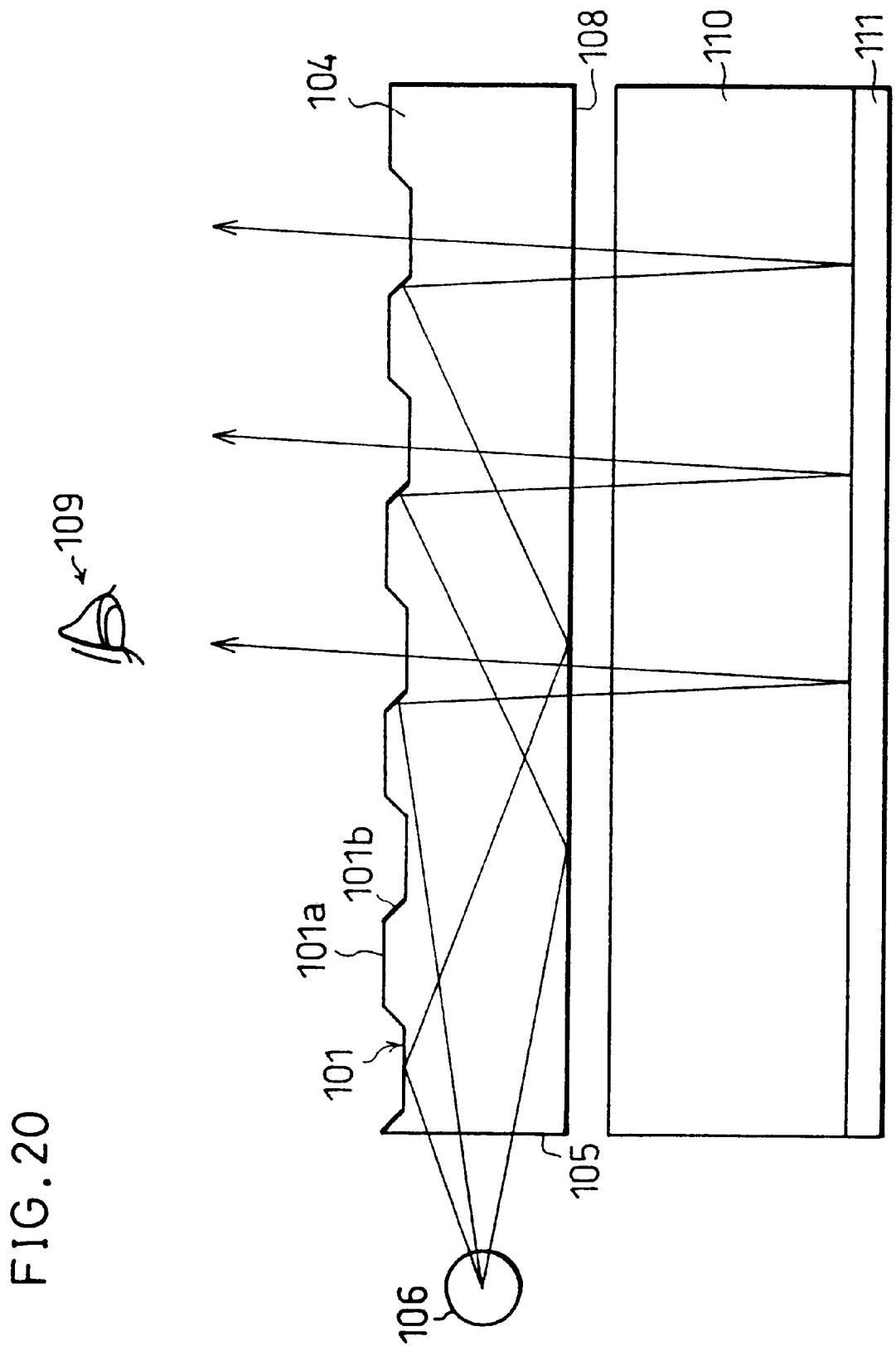

FIG. 20 is an explanatory diagram showing the basic structure of a conventional reflection-type LCD with auxiliary illumination, and showing the behavior of light in such a conventional reflection-type LCD.

Figure 21:
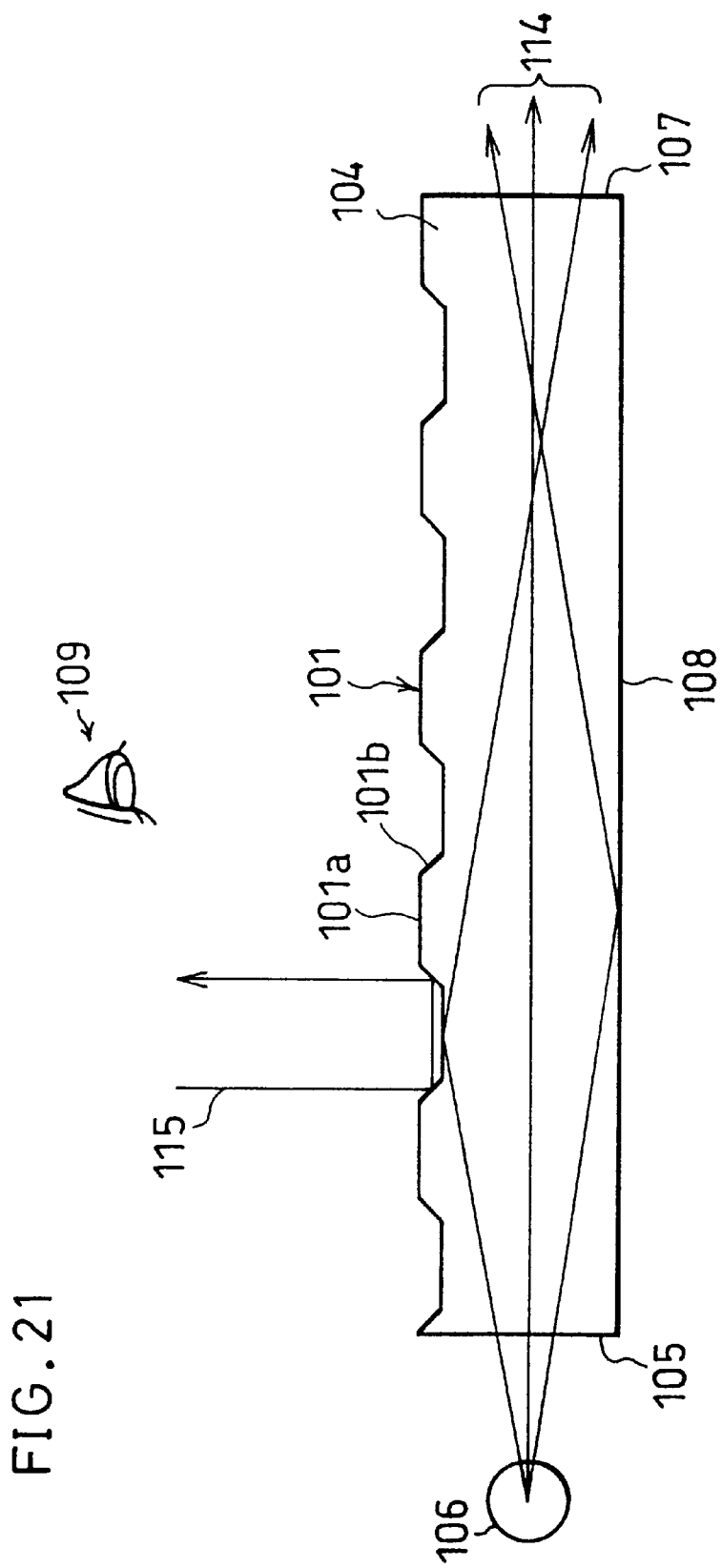

FIG. 21 is an explanatory diagram showing the behavior of light in the conventional reflection-type LCD shown in FIG. 20.

DESCRIPTION OF THE EMBODIMENTS
(First Embodiment)

The following will explain one embodiment of the present invention with reference to FIGS. 1 through 11.

As shown in FIG. 1, one reflection-type LCD according to the present embodiment includes a front-light system 50 (front illumination device) provided on the front of a reflection-type liquid crystal cell 10. A gap between the liquid crystal cell 10 (liquid crystal element) and the front-light system is filled with a filling agent, to be discussed below.

The front-light system 50 is made up of a light-conducting body 54 (first light-conducting body), an anisotropic scattering plate 51 (second light-conducting body), a light source 26, and a reflecting mirror 27 (light condensing means). The light source 26 is a linear light source such as a fluorescent tube, and is provided along a light-entry surface 55 which forms one side of the light-conducting body 54. Further, the reflecting mirror 27 (light condensing means), which converges light from the light source 26 on the light-entry surface 55, is provided so as to completely cover the light-entry surface 55 and the light source 26.

As shown in FIG. 1, the light-conducting body 54 is provided so that its interface 53 toward the viewer (second light exit surface) inclines with respect to its interface 58 toward the liquid crystal cell 10 (first light exit surface). In other words, the light-conducting body 54 is wedge-shaped, so that its shape in cross-section taken perpendicular to the longitudinal direction of the light source 26 is substantially triangular.

In the light-conducting body 54, the interface 58, provided so as to be perpendicular to the light-entry surface 55, projects light from the light source 26 toward the liquid crystal cell 10, and receives light reflected from the liquid crystal cell 10. The interface 53, on the other hand, reflects light from the light source 26 toward the interface 58, and projects light reflected from the liquid crystal cell 10 toward the viewer.

The anisotropic scattering plate 51, layered on the outside of the interface 58 of the light-conducting body 54, in order to increase the portion of light traveling perpendicular to the liquid crystal cell 10, only scatters light projected from the light-conducting body 54 at angles within a predetermined range, and transmits without acting upon light projected at angles outside that predetermined range.

The light-conducting body 54 may be formed by injection molding using a material such as PMMA (polymethylmethacrylate). Specifically, the light-conducting body 54 in the present embodiment was provided with a thickness of 6 mm at its thickest point (the height of the light-entry surface 55) and 1 mm at its thinnest point, a length of 60 mm, and a width of 110 mm. In this case, the angle of inclination of the interface 53 with respect to the interface 58 was approximately 4.8°.

Next, the structure and method of manufacture of the liquid crystal cell 10 will be explained.

As shown in FIG. 1, the liquid crystal cell 10 is chiefly composed of two electrode substrates 11a and 11b, with a liquid crystal layer 12 filling a gap therebetween. In the electrode substrate 11a, a transparent electrode 15a is provided on a glass substrate 14a which has transparency, and the transparent electrode 15a is covered with a liquid crystal alignment film 16a.

The glass substrate 14a may be realized by, for example, a glass plate made by Corning Co. (product 7059). The transparent electrode 15a is made, for example, of ITO (Indium Tin Oxide). The liquid crystal alignment film 16a may be prepared by, for example, using a spin coater to form a coat of an alignment film material made by Japan Synthetic Rubber Co. (product AL-4552) on the glass substrate 14a after the transparent electrode 15a has been provided thereon, and then performing rubbing as alignment processing.

The electrode substrate 11b is prepared in the same manner as the electrode substrate 11a, by layering a transparent electrode 15b and a liquid crystal alignment film 16b, in that order, on a glass substrate 14b. The electrode substrates 11a and 11b may, as necessary, be provided with insulating films, etc.

The electrode substrates 11a and 11b are combined together, using an adhesive, such that the liquid crystal alignment films 16a and 16b are opposite one another, and so that their rubbing directions are parallel but opposite in direction (so-called antiparallel). At this time, by previously dispersing glass bead spacers 4.5 μm in diameter between the electrode substrates 11a and 11b, a gap of uniform interval is provided.

Then, by introducing liquid crystal into this gap by vacuum deaeration, a liquid crystal layer 12 is provided. As material for the liquid crystal layer 12, the liquid crystal made by Merc Co. (product ZLI-3926), for example, may be used. Incidentally, the Δn of this liquid crystal material is 0.2030. However, the liquid crystal material is not limited to this; various types of liquid crystal may be used.

Further, as a reflective plate 17, an aluminum plate which has undergone hairline processing is attached to the outside of the glass substrate 14b using, for example, an epoxy-based adhesive, and a polarizing plate 18, set so that its polarization axis is 45° from the alignment direction of the liquid crystal 12, is installed on the outside of the glass substrate 14a. A gap between the glass substrate 14a and the polarizing plate 18 is filled with a filler agent (not shown) which matches the refractive indices of these two members.

The reflection-type liquid crystal cell 10 is manufactured by means of the foregoing process. By combining this liquid crystal cell 10 with the front-light system 50 in the following manner, a reflection-type LCD with front illumination device can be manufactured. First, the anisotropic scattering plate 51 is layered on the polarizing plate 18 of the liquid crystal cell 10. At this time, a gap between the polarizing plate 18 and the anisotropic scattering plate 51 is filled with a filler agent 19, which matches the refractive indices of these two members.

Next, the light-conducting body 54 is layered on the anisotropic scattering plate 51. A gap between the anisotropic scattering plate 51 and the light-conducting body 54 is filled with a filler agent (not shown), which matches the refractive indices of these two members.

By introducing filler agent into the respective gaps between each of the light-conducting body 54, the anisotropic scattering plate 51, the polarizing plate 18, and the glass substrate 14a, there is no layer of air from the light-conducting body 54 to the glass substrate 14a. By this means, at the optical interfaces from the light-conducting body 54 to the glass substrate 14a, the differences in refractive index are ameliorated or eliminated. Thus, problems such as attenuation in light due to interference of light or reflection at the optical interfaces, and deterioration of display quality due to reflected light, can be resolved. As filler agent, materials such as UV-hardened resin or methyl salicylate may be used.

Next, as the light source 26, a fluorescent tube, for example, is installed opposite the light-entry surface 55 of the light-conducting body 541 and enclosed by the reflecting mirror 27. For the reflecting mirror 27, a material such as aluminum tape may be used.

By means of the foregoing process, a reflection-type LCD provided with a front-light system 50 as a front illumination device is completed. This reflection-type LCD can be used in illuminated mode, with the front-light system 50 illuminated, when surrounding light is insufficient, and in reflective mode, with the front-light system 50 off, when sufficient surrounding light can be obtained. By this means, a reflection-type LCD can be provided which is always capable of stable display, regardless of the surrounding environment.

In the foregoing reflection-type LCD, the light-conducting body 54 has a refractive index roughly equivalent to that of the glass substrate 14a, and, as discussed above, there are no open spaces (air layers) from the light-conducting body 54 to the glass substrate 14a. For these reasons, even when this reflection-type LCD is used in reflective mode, with the front-light system turned off, the light-conducting body 54 does not have a detrimental influence on display.

In the light-conducting body 54, it is preferable if the angle of inclination of the interface 53 with respect to the interface 58 is no more than 40°. The reason for this will be explained below.

Figure 2:
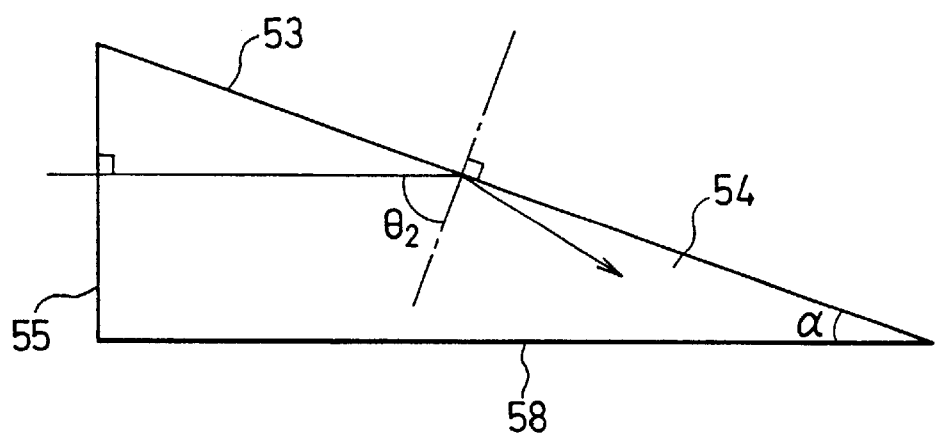
FIG. 2 is an explanatory diagram showing the behavior of light in a light-conducting body of a front-light system included in the reflection-type LCD shown in FIG. 1.

As shown in FIG. 2, light from the light source enters the light-conducting body 54 through the light-entry surface 55. Here, if it is assumed, for the sake of simplicity, that the light entering the light-conducting body 54 through the light-entry surface 55 travels completely parallel, all of the light is projected onto the interface 53.

If the angle of incidence of the light projected onto the interface 53 is smaller than the critical angle, the light passes through the interface 53. Conversely, if the angle of incidence is greater than the critical angle, the light is totally reflected by the interface 53.

Since the front-light system 50 according to the present embodiment uses light reflected from the interface 53 for illumination of the liquid crystal cell 10, it is preferable if all of the projected light is reflected from the interface 53. Here, as shown in FIG. 2, if α is the angle of inclination of the interface 53 with respect to the interface 58, the light projected from the light-entry surface 55 onto the interface 53 has an angle of incidence $\theta_2$ as shown by:

$$\theta_2 = 90° - \alpha$$

If the light-conducting body 54 is formed of an acrylic-based polymer, its refractive index will be approximately 1.5. Incidentally, colorless, transparent organic polymer materials generally have refractive indices from around 1.4 to 1.7. Given this fact, the critical angle of the light-conducting body 54 will usually not be greater than 50°. Accordingly, it can be seen that, in order to ensure that $\theta_2$ is not smaller than 50°, it is preferable if the value of α is 40° or less.

As shown above, by setting the angle of inclination of the interface 53 at no more than 40° with respect to the interface 58, all of the light traveling perpendicular to the light-entry surface 55 is totally reflected from the interface 53, and thus the amount of light leaking from the interface 53 toward the viewer can be reduced. As a result, the efficiency of use of light from the light source is improved, and impairment of display quality due to light leakage from the interface 53 can be prevented.

Further, in consideration of use of the reflection-type LCD according to the present embodiment in reflective mode, when the front-light system 50 is turned off, it is preferable if the angle of inclination α of the interface 53 is no more than 10° with respect to the interface 58. The reason for this will be explained below.

Figure 3:
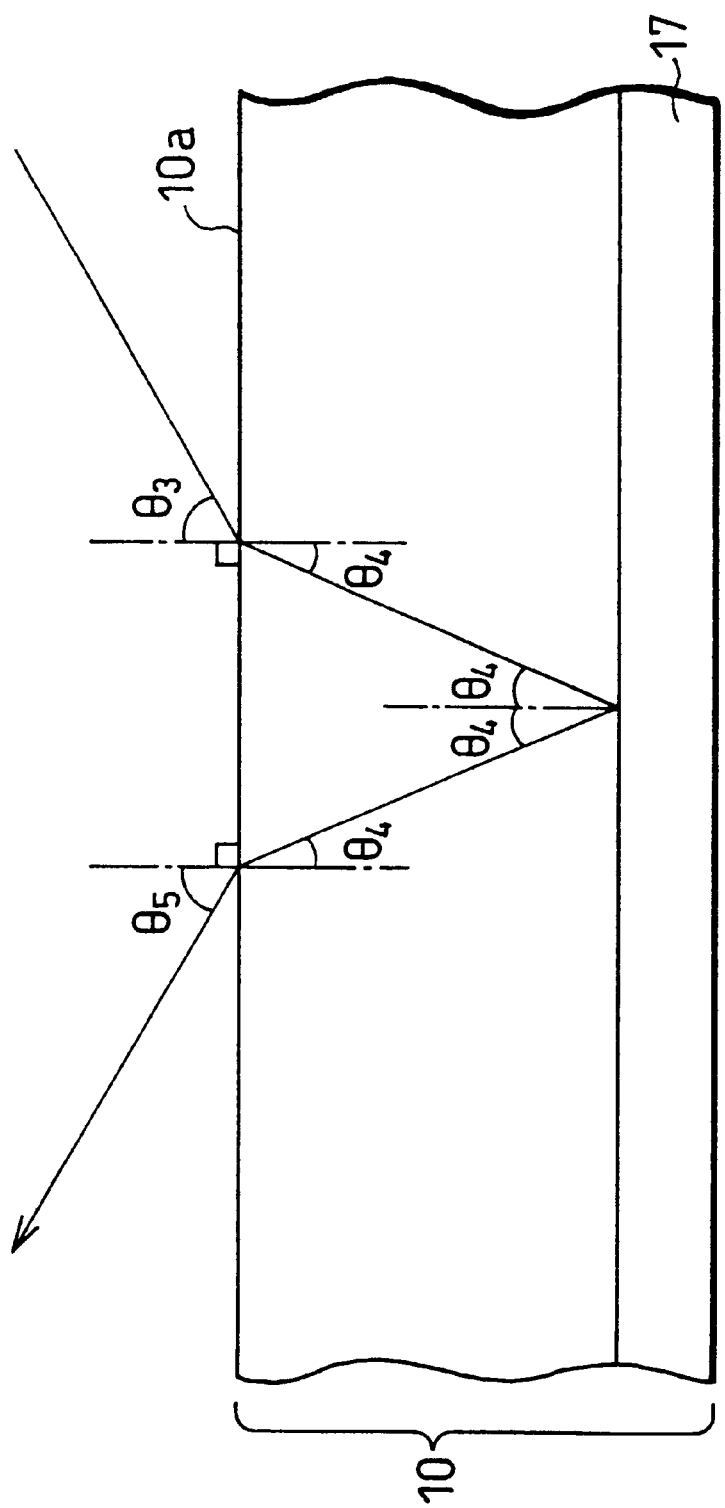
FIG. 3 is an explanatory diagram showing the behavior of light when surrounding light is projected into a liquid crystal cell alone.

First, for comparative purposes, the behavior of surrounding light projected into a liquid crystal cell 10 alone will be explained with reference to FIG. 3. As shown in FIG. 3, in a hypothetical case where surrounding light is projected directly into the liquid crystal cell 10, the surrounding light is projected onto the surface 10a of the liquid crystal cell 10 at an angle of incidence of $\theta_3$, proceeds into the liquid crystal cell 10 at an exit angle of $\theta_4$, is reflected from a reflective plate 17 provided at the bottom of the liquid crystal cell 10, is again projected onto the surface 10a, and is refracted to exit at an angle of $\theta_5$. In this case, if the refractive index of the liquid crystal cell 10 is $n_1$, the angles $\theta_3$ through $\theta_5$ are as shown by:

$$\theta_4 = \arcsin((\sin\theta_3)/n_1)$$

$$\theta_5 = \arcsin(n_1 \times \sin\theta_4)$$

From the above, it can be seen that $\theta_3 = \theta_5$.

Figure 4:
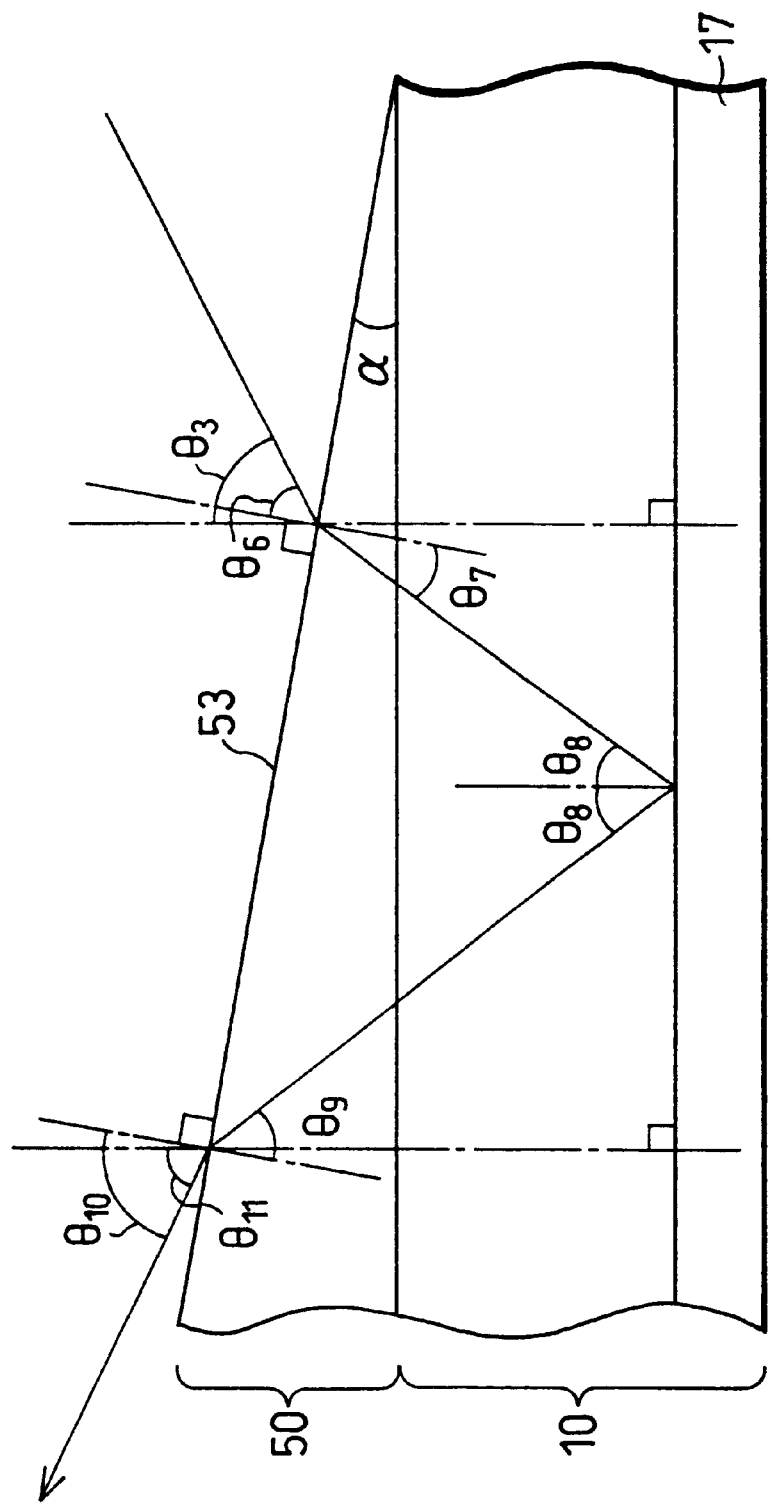
FIG. 4 is an explanatory diagram showing the behavior of light when surrounding light is projected into the reflection-type LCD shown in FIG. 1 when this reflection-type LCD is used in reflective mode.

In contrast, in the reflection-type LCD according to the present embodiment, as shown in FIG. 4, since the front-light system 50 is provided on the front of the liquid crystal cell 10, the angle of incidence $\theta_6$ of the surrounding light at the surface of the reflection-type LCD (i.e., at the interface 53 of the light-conducting body 54), the exit angle $\theta_7$ from the interface 53, the angle of incidence (angle of reflection) $\theta_8$ at the reflective plate 17, the angle of incidence $\theta_9$ when again entering the interface 53, and the exit angle $\theta_{10}$ from the interface 53 are as shown by the following equations. Here, as in the case above, the surrounding light is projected at an angle of $\theta_3$ with respect to the normal direction of the reflective plate 17.

$$\theta_6 = \theta_3 - \alpha$$

$$\theta_7 = \arcsin((\sin\theta_6)/n_1)$$

$$\theta_8 = \theta_7 + \alpha$$

$$\theta_9 = \theta_8 + \alpha$$

$$\theta_{10} = \arcsin(n_1 \times \sin\theta_9)$$

Here, if the angle of light exiting from the interface 53 is $\theta_{11}$ with respect to the normal direction of the reflective plate 17, $\theta_{11}$ is as shown by the following equation.

$$\theta_{11} = \arcsin[n_1 \cdot \sin[\arcsin\{\sin(\theta_3 - \alpha)/n_1 + 2\alpha\}]]$$

Figure 5:
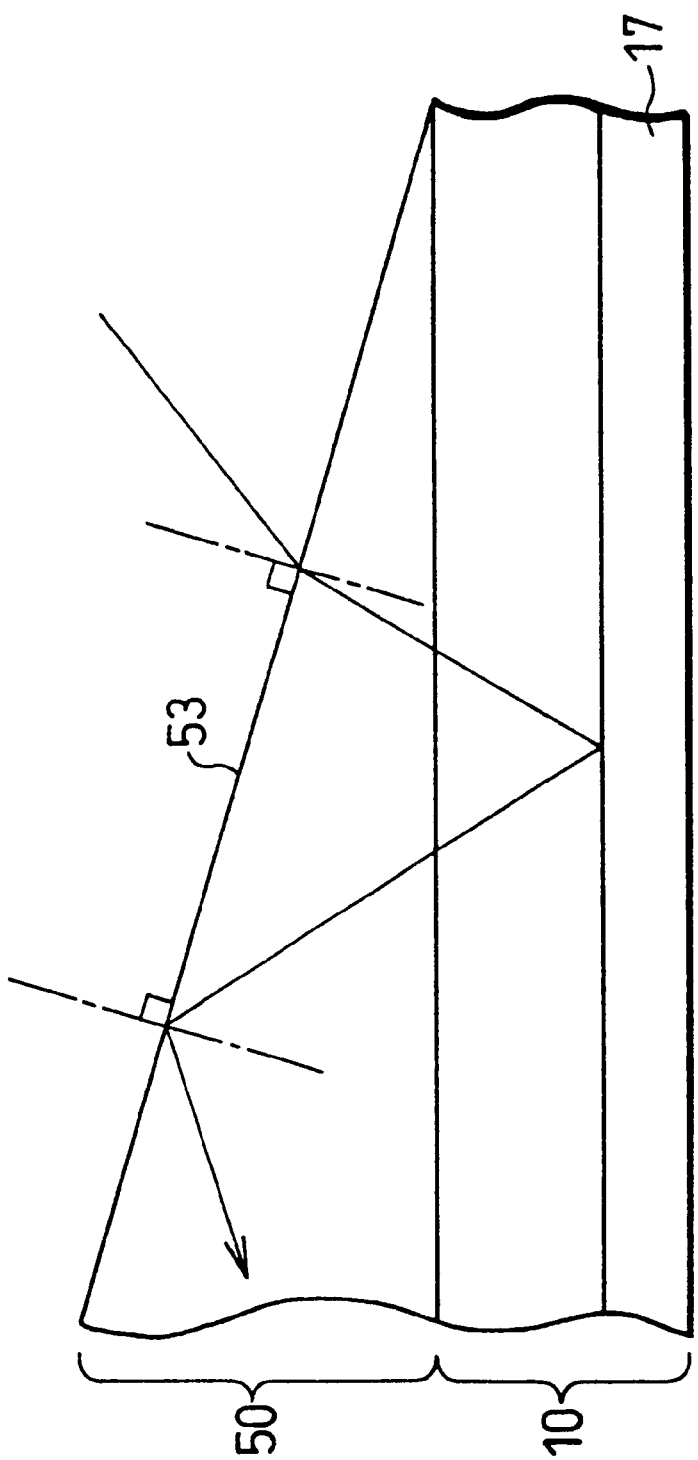
FIG. 5 is an explanatory diagram showing a case in which surrounding light projected into a light-conducting body becomes stray light, for purposes of comparison with the front-light system included in the reflection-type LCD shown in FIG. 1.

In this way, it can be seen that, by providing the front-light system 50 on the front of the liquid crystal cell 10, the relationship between the angles of incoming and outgoing light differs from that in the case of the liquid crystal cell 10 alone. In particular, when the angle of inclination $\alpha$ of the interface 53 with respect to the interface 58 is large, as shown in FIG. 5, a portion of the outgoing light is likely to be reflected from the interface 53 of the light-conducting body 54, thus becoming stray light. Thus a large angle of inclination $\alpha$ is not preferable.

Figure 6:
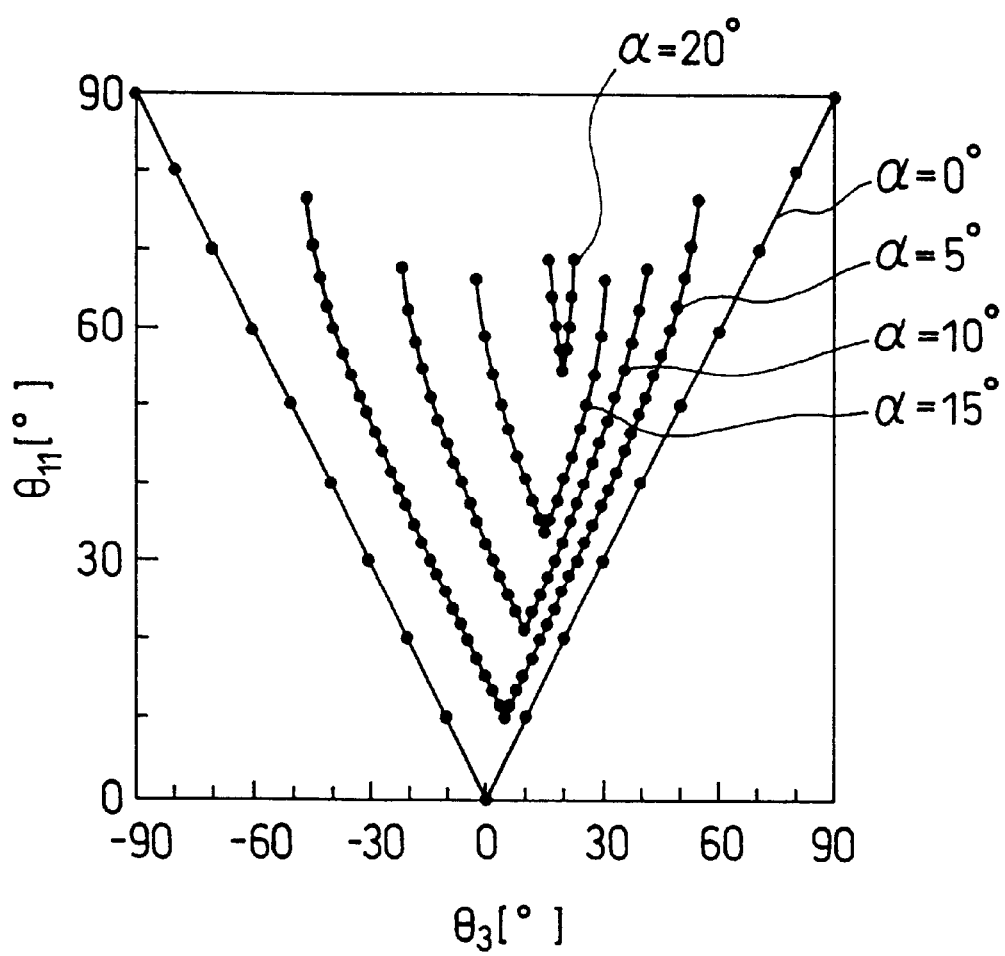
FIG. 6 is a graph showing changes in the incident angle $\theta_3$ (angle with respect to normal direction of reflective plate)

Next, FIG. 6 shows the results of calculation, using $\theta_{11}$, and a refractive index $n_1$ of 1.5, of the angle $\theta_3$ of surrounding light projected onto the interface 53, and the angle $\theta_{11}$ of light exiting from the interface 53, both with respect to the normal direction of the reflective plate 17, for various angles of inclination $\alpha$. In FIG. 6, with respect to $\theta_3$ positive values indicate the clockwise direction in FIG. 4, and negative values indicate the counterclockwise direction in FIG. 4. Further, for the sake of simplicity, no distinction has been made between positive and negative with respect to $\theta_{11}$.

As is clear from a comparison of the possible range of $\theta_3$ for each value of $\alpha$ in FIG. 6, the greater the angle of inclination $\alpha$, the smaller the usable range of angles of surrounding light during reflective mode (with the front-light system 50 off).

Further, as is clear from a comparison of the minimum value of $\theta_{11}$ for each value of $\alpha$ in FIG. 6, the greater the angle of inclination $\alpha$, the greater the minimum value of the exit angle. This means, in other words, that the portion of light exiting nearly horizontally is increased, and the portion of light exiting close to the normal direction of the reflective plate 17 is reduced.

Since the viewer generally views the display directly from the front, i.e., from the normal direction of the reflective plate 17, it is preferable if light exits within the range $\theta_{11} \leq 30°$. Accordingly, based on FIG. 6, it is preferable if the value of the angle of inclination $\alpha$ is 10° or less, and more preferable if it is 5° or less. In this case, when the reflection-type LCD according to the present embodiment is used in reflective mode, the amount of light exiting in the normal direction of the reflective plate 17 is increased, enabling bright display.

The following will explain the characteristics of the anisotropic scattering plate 51 used as the second light-conducting body. The anisotropic scattering plate 51 is a forward-scattering body which, as shown in FIG. 7, scatters light entering from the light-conducting body 54 only in the direction the light is traveling, and is also an anisotropic scattering body having characteristics whereby it only scatters light entering at angles within the predetermined range shown in FIG. 8 (−10° through −70°), while fully transmitting light entering at angles outside this predetermined range. As a material meeting these conditions, products such as the viewing angle control plate made by Sumitomo Chemical Co., Ltd. (product name: Lumisty), for example, are available on the market.

Since the anisotropic scattering plate 51 is a forward-scattering body, the portion of light scattered backward, i.e., toward the viewer, prior to light modulation by the liquid crystal cell 10 can be eliminated, thus improving display quality. FIG. 7 schematically shows scattered light being projected from the interface between the anisotropic scattering plate 51 and the filler agent 19, but actually, light from the light-conducting body 54 is scattered as it travels through the anisotropic scattering plate 51.

The angle of incidence of light from the light-conducting body 54 entering the anisotropic scattering plate 51 is approximately 70°, and this angle of incidence is within the range of angles of light (−10° through −70°) scattered by the anisotropic scattering plate 51. For this reason, the anisotropic scattering plate 51 only scatters light guided through the light-conducting body 54 (first light-conducting body), and transmits without acting upon all other light. Accordingly, surrounding light (in reflective mode) and reflected light from the liquid crystal cell 10 pass through the anisotropic scattering plate 51 without scattering, and thus the anisotropic scattering plate 51 has no detrimental influence on display quality in reflective mode.

The following will explain the results of measurement of the intensity of illumination of the front-light system 50. In order to measure the intensity of illumination of the front-light system 50, a measurement system like that shown in FIG. 9 was used. With the normal direction of the anisotropic scattering plate 51 being 0°, light intensity was measured within a range from 0° through ±90° using a sensor 34. This measurement was made in a container filled with a matching agent having a refractive index equal to that of the light-conducting body 54 (an oil bath, for example).

The measurement results are shown in FIG. 10. As is clear from FIG. 10, by means of the anisotropic scattering plate 51, the front-light system 50 is able to project the light from the light-conducting body 54 (angle of incidence at anisotropic scattering plate 51: approx. 70°) toward the liquid crystal cell 10 at an angle closer to perpendicular.

Further, as shown in FIG. 8, the reflection-type LCD according to the present embodiment will rarely be viewed from a direction between −10° and −70°, the range of angles of light scattered by the anisotropic scattering plate 51. Accordingly, within the range of normal use, scattering of light by the anisotropic scattering plate 51 will have no influence on the viewer's viewing of the display image of the liquid crystal cell 10.

The reflection-type LCD according to the present embodiment has the advantage of being capable of display which is brighter than that of self-illuminating displays such as transmission-type LCDs, CRTs, and PDPs.

To explain: as shown in FIG. 11(a) light 36a from a self-illuminating display 35 is projected in a direction opposite that of surrounding light 37. For this reason, the light viewed by the viewer is the portion 36b remaining after subtracting the surrounding light 37 from the light 36a.

In contrast, when the reflection-type LCD according to the present embodiment is used in illuminated mode, as shown in FIG. 11(b), auxiliary light 39a from a front-light 20 and surrounding light 37 are both reflected from the reflective plate (not shown) of the liquid crystal cell 10, and the portion 39b viewed by the viewer is the total of the auxiliary light 39a plus the surrounding light 37. For this reason, a brighter display can be realized, not only in dark areas but also in bright areas such as outdoors during the day.

(Second Embodiment)

Another embodiment of the present invention will be explained below with reference primarily to FIGS. 12 through 15. Structures having the same functions as structures explained in the first embodiment above will be given the same reference symbols, and explanation thereof will be omitted.

As shown in FIG. 12, the reflection-type LCD according to the present embodiment is provided with a hologram 52, which diffracts light from the light-conducting body 54, instead of the anisotropic scattering plate 51 of the first embodiment, which scatters light from the light-conducting body 54.

Since a hologram, based on the principle of light diffraction, has the effect of controlling the reflection and refraction of light, a single hologram can be given several types of optical characteristics. First, a typical method of preparing a hologram will be explained in brief, with reference to FIG. 13.

As shown in FIG. 13, light from a light source 127 is projected onto a photosensitive polymer 124 coated on the surface of a base. Light 127a projected from the light source 127 is split into light 127c and 127d by a beam splitter 123. The light 127c is scattered by an object 128, and is projected onto the photosensitive polymer 124 as object light 126. The light 127d is reflected by a mirror 129, and is projected onto the photosensitive polymer 124 at a predetermined angle as reference light 125. Due to interference between the object light 126 and the reference light 125, layers with high refractive index and layers with low refractive index are formed on a sub-micron order in the photosensitive polymer 124, thus producing a hologram. With a hologram which has been recorded in this way, by projecting light onto the hologram from the direction from which the reference light was projected, the image recorded is reconstructed as object light 126.

For the light source 127, a device which produces coherent light, such as a laser, is used. By adjusting the conditions of the light from the light source 127, such as wavelength and intensity, a hologram can be produced in which the object light 126 realizes an output light of desired direction and spread angle.

Figure 14A:
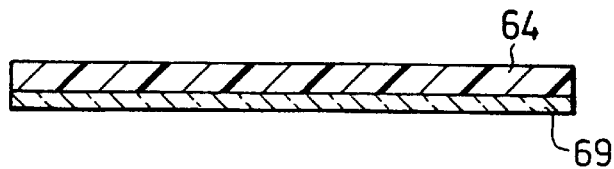

The following will explain, with reference to FIGS. 14(a) through 14(d), a method of producing a front-light system 60 provided with a hologram 52. First, as shown in FIG. 14(a), a photosensitive polymer 64 is coated onto the surface of a polyester film 69 serving as a base. For the photosensitive polymer 64, a photo-polymer made by Polaroid Co. (product: DMP-128), for example, may be used.

Figure 14B:
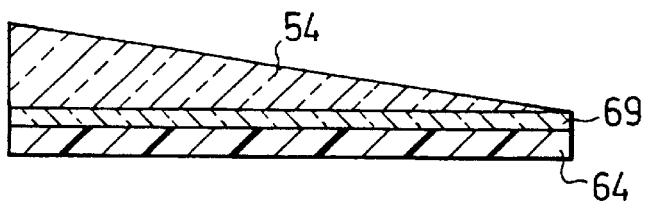

Next, the light-conducting body 54 explained in the first embodiment is mounted as shown in FIG. 14(b) on the side of the polyester film 69 opposite the side on which the photosensitive polymer 64 is coated.

Figure 14C:
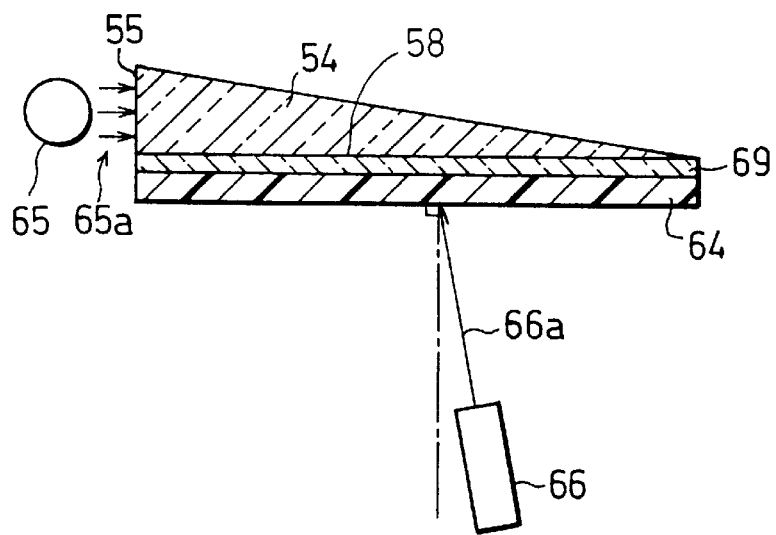

Then, as shown in FIG. 14(c), a light source 65 is placed opposite the light-entry surface 55 of the light-conducting body 54, and reference light 65a is projected through the light-entry surface 55. At the same time, a light source 66 is placed at an angle inclined 10° with respect to the normal direction of the interface 58 of the light-conducting body 54, and object light 66a is projected onto the photosensitive polymer 64. In the present embodiment, the object light 66a is projected at an angle inclined 10° from the normal direction of the photosensitive polymer 64, and the reference light 65a is projected onto the photosensitive polymer 64 (as second light-conducting body) at an angle of incidence equivalent to that of the light transmitted by the light-conducting body 54.

Figure 14D:
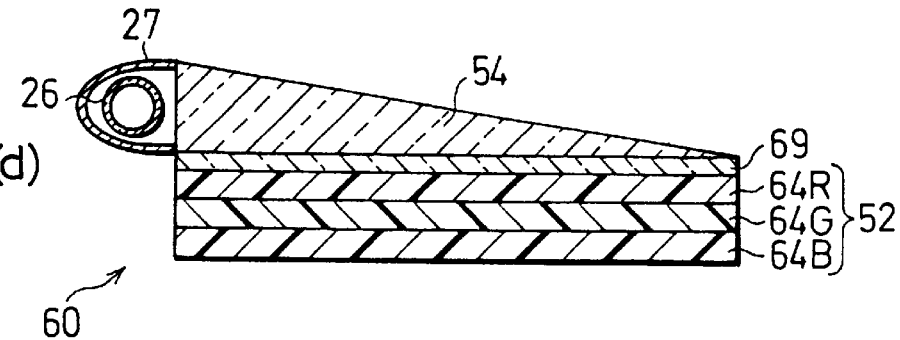

By projecting the reference light 65a and the object light 66a for each of red, green, and blue components, a red hologram 64R, a green hologram 64G, and a blue hologram 64B, corresponding to the red, green, and blue components, can be formed in separate layers, as shown in FIG. 14(d). In other words, the hologram 52 is made up of the holograms 64R, 64G, and 64B.

Finally, the front-light system 60 according to the present embodiment is completed by providing a fluorescent tube (three-wavelength tube) as the light source 26, and covering the light-entry surface 55 and the light source 26 with the reflecting mirror 27.

By means of the foregoing process, a reflection-type LCD provided with a front-light system 60 as a front illumination device is completed. This reflection-type LCD can be used in illuminated mode, with the front-light system 60 illuminated, when surrounding light is insufficient, and in reflective mode, with the front-light system 60 off, when sufficient surrounding light can be obtained. By this means, a reflection-type LCD can be provided which is always capable of stable display, regardless of the surrounding environment.

The following will explain the results of measurement of the intensity of illumination of the front-light system 60. The measurement system shown in FIG. 9 was used to measure the intensity of illumination. The measurement results are shown in FIG. 15. As is clear from FIG. 15, by using the hologram 52 as the second light-conducting body, the front-light system 60 is able to project the light from the light-conducting body 54 (angle of incidence at the hologram 52: approx. 70°) toward the liquid crystal cell 10 at an angle nearly perpendicular. Further, as a comparison between FIGS. 10 and 15 clearly shows, the hologram 52 has the advantage of being able to adjust the angle of outgoing light to within a certain range with greater precision than the anisotropic scattering plate 51 used in the first embodiment.

In the foregoing explanation, a hologram was prepared using a photosensitive polymer, but, as long as the same effect can be obtained, there is no need to be limited to this. Again, the direction of projection of the object light in recording need not be limited to the direction mentioned above. Again, in the foregoing explanation, for the sake of conformity between the direction the light-conducting body transmits the light from the light source to the hologram 52 and the direction of projection of the reference light, the reference light 65a was projected through the light-entry surface 55 of the light-conducting body 54, but another method having the same effect, such as attaching a previously recorded hologram plate to the light-conducting body 54, may also be adopted. Further, the foregoing explained a structure in which a hologram is used to diffract light projected from the light-conducting body 54 (first light-conducting body) and project the light toward the liquid crystal cell 10 at an angle nearly perpendicular, but use of a member other than a hologram, such as a diffraction grating, is also possible.

(Third Embodiment)

A further embodiment of the present invention will be explained below with reference to FIGS. 16 through 19. Structures having the same functions as structures explained in either of the foregoing embodiments will be given the same reference symbols, and explanation thereof will be omitted.

As shown in FIG. 16, the reflection-type LCD according to the present embodiment has, instead of the front-light system 50 of the first embodiment, a front-light system 70, which further includes a diffusion plate 82 and a prism sheet 81, for limiting the spread of light from the light source 26, provided between the light source 26 and the light-entry surface 55.

Light emitted by the fluorescent tube generally used for the light source 26 has no particular directivity, and is emitted randomly. For this reason, some light leaks toward the viewer from the interface 53 of the light-conducting body 54, which may impair display quality.

If the light-conducting body 54 is made of PMMA, since PMMA has a refractive index of approximately 1.5, the critical angle $\theta_c$ of the interface 53 is approximately 42°. Accordingly, if the angle of incidence at the interface 53 is less than 42°, light leakage occurs. In order to prevent this, it is sufficient to ensure that no light is projected into the light-conducting body 54 at an angle which will cause leakage.

Here, if the angle of inclination of the interface 53 with respect to the interface 58 is $\alpha$, and the angle of spread of light entering from the light-entry surface 55 is $\pm\beta$, then the light's angle of incidence $\theta$ at the interface 53 is shown by:

$$\theta=90°-\alpha-\beta$$

Accordingly, the conditions for ensuring that light projected onto the interface 53 from the light-entry surface 55 will not pass through the interface 53 are shown by:

$$\theta_c<\theta=90°-\alpha-\beta$$

in other words:

$$\beta<90°-(\theta_c+\alpha) \quad \text{(Equation 2)}$$

Since, in the present embodiment, as in the first embodiment above, the angle of inclination $\alpha$ of the interface 53 with respect to the interface 58 is 4.8°, and the critical angle $\theta_c$ is 42°, then, on the basis of Equation 2, $\beta<43.2°$.

Light emitted by the light source 26 is first diffused by the diffusion plate 82, and then projected into the prism sheet 81. In the present embodiment, the apex angle of the prism sheet 81 is 100°. The prism sheet 81 has the function of condensing diffused light into a certain range of angles, and if the apex angle of the prism is 100°, as shown in FIG. 18, the diffused light is condensed into a range of approximately ±40°. When the light condensed into a range of approximately ±40° enters the light-conducting body 54, it is further condensed by the refraction of the light-entry surface 55, and becomes light with a range of spread of approximately ±25.4°. In other words, the angle of spread of the light entering the light-entry surface 55 is well within the above-mentioned range $\beta<43.2°$, and no leakage of light from the interface 53 toward the viewer occurs.

As discussed above, in the present embodiment, in order to limit the spread of light from the light source, a diffusion plate 82 and a prism sheet 81 are provided between the light source 26 and the light-entry surface 55 of the light-conducting body 54, and accordingly there is no leakage of light from the interface 53 toward the viewer, thus further improving display quality.

In the present embodiment, the prism sheet 61 was used as a light control means for limiting the spread of light from the light source, but, as long as the same effect can be obtained, there is no need to be limited to this. For example, a collimator may be used. Again, as shown in FIG. 19(a), the same effect may be obtained with a structure in which the light source 26 is surrounded by an ellipsoidal mirror 98, at the focal point of which the light source 26 is placed. Further, as discussed in SID DIGEST (1995) p.375, a light pipe 99 like that shown in FIG. 19(b) may also be used to control the spread of light from the light source 26.

The foregoing embodiments do not limit the present invention; many variations are possible within the scope of the present invention. For example, PMMA was cited as a specific example of a material for a light-conducting body of the front-light system, but any material able to conduct light uniformly without attenuation, and having a refractive index which is a suitable value, may be used, such as glass, polycarbonate, polyvinyl chloride, polyester, etc.

In addition, for the liquid crystal cell, various types of LCD may be used, such as simple matrix LCD, active matrix LCD, etc. Again, the foregoing embodiments used an ECB mode (single polarizing plate mode) liquid crystal cell, in which a single polarizing plate serves as both polarizer and analyzer, but other modes not using a polarizing plate may also be applied, such as PDLC, PC-GH, etc.

The concrete embodiments and examples of implementation discussed in the foregoing detailed explanations of the present invention serve solely to illustrate the technical details of the present invention, which should not be narrowly interpreted within the limits of such concrete examples, but rather may be applied in many variations without departing from the spirit of the present invention and the scope of the patent claims set forth below.

What is claimed is:

1. A front illumination device comprising a light source and a light-conducting body which guides light from said light source to an object to be illuminated, said front illumination device to be used by mounting in front of said illuminated object, wherein:

said light-conducting body includes a first light-conducting body provided with a light-entry surface, through which light from said light source enters, and a second light-conducting body provided with a light exit surface, through which light exits toward said illuminated object;

said first light-conducting body guides light from said light-entry surface to said second light-conducting body;

said second light-conducting body is provided so that light exiting therefrom exits in a direction closer to a normal direction of said light exit surface of said second light-conducting body than a direction in which light, guided by said first light-conducting body from said light-entry surface toward said second light-conducting body, strikes said light exit surface of said first light-conducting body; and said second light-conducting body is a light-scattering body, which scatters light.

2. The front illumination device set forth in claim 1, wherein:

said light-scattering body is a forward-scattering body.

3. The front illumination device set forth in claim 1, wherein:

said light-scattering body is an anisotropic scattering body, which only scatters incident light having angles of incidence within a predetermined range; and at least part of the light projected from said first light-conducting body into said second light-conducting body has angles of incidence falling within the predetermined range.

4. The front illumination device set forth in claim 1, further comprising:

light control means, provided between said light source and said light-entry surface, which limit spread from said light source.

5. The front illumination device set forth in claim 1, wherein:

a gap between said first and second light conducting bodies is filled with a filler agent, which alleviates differences in refractive indices at optical interfaces between said first and second light conducting bodies.

6. The front illumination device set forth in claim 1, further comprising:

light-condensing means, which conveys light from said light source onto only said light-entry surface of said first light-conducting body.

7. The front illumination device set forth in claim 1, wherein:

said first light-conducting body is a polyhedron provided with a light-entry surface, through which light from said light source enters, a first light exit surface, through which light exits toward said illuminated object, and a second light exit surface opposite said first light exit surface; and said first and second light exit surfaces being provided so that a distance therebetween grows smaller the greater a distance from said light-entry surface.

8. The front illumination device set forth in claim 7, wherein:

$\alpha \leq 90° - \theta_c$ is satisfied, where:

$\alpha$ is an angle of inclination of said second light exit surface with respect to said first light exit surface; and $\theta_c$ is a critical angle of said second light exit surface.

9. The front illumination device set forth in claim 7, wherein:

an angle of inclination of said second light exit surface with respect to said first light exit surface is no more than 40°.

10. A front illumination device comprising a reflection-type liquid crystal display element which has a reflective plate, in which:

the front illumination device set forth in claim 7 is provided on the front of crystal element; and said first light-conducting body of said front illumination device is structured such that an angle of inclination of said second light exit surface with respect to said first light exit surface is no more than 10°.

11. A reflection-type liquid crystal display device comprising a reflection-type liquid crystal element which has a reflective plate, in which:

the front Illumination device set forth in claim 1 is provided on the front of said reflection-type liquid crystal element.

12. The reflection-type liquid crystal display device set forth in claim 11, wherein:

a gap between said reflection-type liquid crystal element and said front illumination device is filled with a filler agent, which alleviates differences in refractive indices at optical interfaces between said reflection-type liquid crystal element and said front illumination device.

13. The front illumination device set forth in claim 1, wherein:

said second light-conducting body only causes light having angles of incidence within a predetermined range to exit in a direction closer to the normal direction; and at least part of the light projected from said first light-conducting body into said second light-conducting body has angles of incidence falling within the predetermined range.

14. A front illumination device comprising a light source and a light-conducting body which guides light from said light source to an object to be illuminated, and front illumination device to be used by mounting in front of said illuminated object, wherein:

said light-conducting body includes a first light-conducting body provided with a light-entry surface, through which light from said light source enters, and a second light-conducting body provided with a light exit surface, through which light exits toward said illuminated object, said second light-conducting body being deposited on a side of said first light-conducting body opposite to said illuminated object;

said first light-conducting body guides light from said light-entry surface to said second light-conducting body;

said second light-conducting body is provided so that light exiting therefrom exits in a direction closer to a normal direction of said light exit surface than a direction in which light exits from said first light-conducting body; and said second light-conducting body is a light-scattering body, which scatters light.

15. The front illumination device set forth in claim 14, wherein:

said light-scattering body is a forward-scattering body.

16. The front illumination device set forth in claim 14, wherein:

said light-scattering body is an anisotropic scattering body, which only scatters incident light having angles of incidence within a predetermined range; and at least part of the light projected from said first light-conducting body into said second light-conducting body has angles of incidence falling within the predetermined range.

17. The front illumination device set forth in claim 14, further comprising:

light control means, provided between said light source and said light-entry surface, which limits spread of light from said light source.

18. The front illumination device set forth in claim 14, wherein:
 a gap between said first and second light-conducting bodies is filled with a filler agent, which alleviates differences in refractive indices at optical interfaces between said first and second light-conducting bodies.

19. The front illumination device set forth in claim 14, further comprising:
 light-condensing means, which converge light from said light source onto only said light-entry surface of said first light-conducting body.

20. The front illumination device set forth in claim 14, wherein:
 said first light-conducting body is a polyhedron provided with a light-entry surface, through which light from said light source enters, a first light exit surface, through which light exits toward said illuminated object, and a second light exit surface opposite said first light exit surface; and
 said first and second light exit surfaces are provided so that a distance therebetween grows smaller the greater a distance from said light-entry surface.

21. The front illumination device set forth in claim 20, wherein:
 $\alpha \leq 90° - \theta_c$ is satisfied, where:
  $\alpha$ is an angle of inclination of said second light exit surface with respect to said first light exit surface; and
  $\theta_c$ is a critical angle of said second light exit surface.

22. The front illumination device set forth in claim 20, wherein:
 an angle of inclination of said second light exit surface with respect to said first light exit surface is no more than 40°.

23. A front illumination device comprising a reflection-type liquid crystal display element which has a reflective plate, in which:
 the front illumination device set forth in claim 20 is provided on the front of crystal element; and
 said first light-conducting body of said front illumination device is structured such that an angle of inclination of said second light exit surface with respect to said first light exit surface is no more than 10°.

24. A reflection-type liquid crystal display device comprising a reflection-type liquid crystal element which has a reflective plate, in which:
 the front Illumination device set forth in claim 14 is provided on the front of said reflection-type liquid crystal element.

25. The reflection-type liquid crystal display device set forth in claim 24, wherein:
 a gap between said reflection-type liquid crystal element and said front illumination device is filled with a filler agent, which alleviates differences in refractive indices at optical interfaces between said reflection-type liquid crystal element and said front illumination device.

26. The front illumination device set forth in claim 14, wherein:
 said second light-conducting body only causes light having angles of incident within a predetermined range to exit in a direction closer to the normal direction; and
 at least part of the light projected from said first light-conducting body into said second light-conducting body has angles of incident falling within the predetermined range.

27. A front illumination device comprising a light source and a light-conducting body which guides light from said light source to an object to be illuminated, said front illumination device to be used by mounting in front of said illuminated object, wherein:
 said light-conducting body includes a first light-conducting body provided with a light-entry surface, through which light from said light source enters, and a second light-conducting body provided with a light exit surface, through which light exits toward said illuminated object;
 said first light-conducting body guides light from said light-entry surface to said second light-conducting body;
 said second light-conducting body is provided so that light exiting therefrom exits in a direction closer to a normal direction of said light exit surface of said second light-conducting body than a direction in which light, guided by said first light-conducting body from said light-entry surface toward said second light-conducting body, strikes said light exit surface of said first light-conducting body; and
 said second light-conducting body is a diffraction element, which diffracts light.

28. The front illumination device set forth in claim 27, wherein:
 said diffracting element only diffracts light having angles of incidence within a predetermined range; and
 at least part of the light projected from said first light-conducting body into said diffracting element has angles of incidence falling within the predetermined range.

29. The front illumination device set forth in claim 27, wherein:
 said diffracting element is a hologram.

* * * * *